US 7,467,372 B2

(12) United States Patent
Loughlin et al.

(10) Patent No.: US 7,467,372 B2
(45) Date of Patent: Dec. 16, 2008

(54) DEVICE CONFIGURATION AND MANAGEMENT DEVELOPMENT SYSTEM

(75) Inventors: Thomas Loughlin, Belfast (GB); John Slaby, Foxboro, MA (US)

(73) Assignee: Virtual Access Technology Limited, Dublin (IL)

( * ) Notice: Subject to any disclaimer, the term of this patent is extended or adjusted under 35 U.S.C. 154(b) by 517 days.

(21) Appl. No.: 10/484,871

(22) PCT Filed: Jul. 23, 2002

(86) PCT No.: PCT/GB02/03338

§ 371 (c)(1),
(2), (4) Date: Sep. 13, 2004

(87) PCT Pub. No.: WO03/012635

PCT Pub. Date: Feb. 13, 2003

(65) Prior Publication Data

US 2006/0101375 A1   May 11, 2006

(30) Foreign Application Priority Data

Jul. 27, 2001   (GB)   ................................. 0118377.1

(51) Int. Cl.
 *G06F 9/45* (2006.01)

(52) U.S. Cl. ..................................................... 717/106
(58) Field of Classification Search .................. 717/106
 See application file for complete search history.

(56) References Cited

U.S. PATENT DOCUMENTS

| 3,557,598 | A |   | 1/1971  | Langewis |
| 3,911,706 | A |   | 10/1975 | Davis |
| 5,339,435 | A | * | 8/1994  | Lubkin et al. ................ 717/121 |
| 5,442,782 | A |   | 8/1995  | Malatesta et al. ........... 395/600 |
| 5,515,524 | A |   | 5/1996  | Lynch et al. |
| 5,557,775 | A |   | 9/1996  | Shedletsky .................. 395/500 |
| 5,715,461 | A |   | 2/1998  | Yoshitomi ................... 395/710 |
| 5,761,673 | A |   | 6/1998  | Bookman et al. ........... 707/104 |
| 5,898,835 | A |   | 4/1999  | Truong ................... 395/200.47 |
| 5,956,487 | A |   | 9/1999  | Venkatraman et al. . 395/200.48 |

(Continued)

FOREIGN PATENT DOCUMENTS

DE   951 407   10/1956

(Continued)

OTHER PUBLICATIONS

"Disk Drive With Embedded Hyper-Text Markup Language Server,", *IBM Technical Disclosure Bulletin, IBM Corp.*, New York, US, vol. 38, No. 12, XP000588211, ISSN: 0018-8689, (Dec. 1, 1995), 479.

(Continued)

*Primary Examiner*—John Chavis
(74) *Attorney, Agent, or Firm*—Schwegman, Lundberg & Woessner, P.A.

(57) ABSTRACT

A device configuration development system uses a common configuration and management database for the development of configuration and management data. A device management system for set of devices is provided from the common and management data for the management and configuration of a set of devices. Each device in the set of devices is also provided with a subset of management and configuration data related to the device.

56 Claims, 27 Drawing Sheets

U.S. PATENT DOCUMENTS

| | | | | |
|---|---|---|---|---|
| 5,956,513 | A | * | 9/1999 | McLain, Jr. ............... 717/142 |
| 5,960,439 | A | | 9/1999 | Hamner et al. .......... 707/103 R |
| 5,996,010 | A | | 11/1999 | Leong et al. ............... 709/223 |
| 5,999,941 | A | | 12/1999 | Andersen .................. 707/103 |
| 6,002,854 | A | | 12/1999 | Lynch et al. ........... 395/500.01 |
| 6,003,077 | A | | 12/1999 | Bawden et al. ............. 709/223 |
| 6,006,242 | A | | 12/1999 | Poole et al. ................ 707/531 |
| 6,008,805 | A | | 12/1999 | Land et al. ................. 345/335 |
| 6,012,152 | A | | 1/2000 | Douik et al. ................. 714/26 |
| 6,044,217 | A | | 3/2000 | Brealey et al. ............. 395/701 |
| 6,058,400 | A | | 5/2000 | Slaughter ................... 707/201 |
| 6,115,547 | A | | 9/2000 | Ghatate et al. ........ 395/500.34 |
| 6,151,023 | A | | 11/2000 | Chari ......................... 345/349 |
| 6,237,135 | B1 | * | 5/2001 | Timbol ....................... 717/107 |

FOREIGN PATENT DOCUMENTS

| | | |
|---|---|---|
| DE | 19 59 873 | 6/1970 |
| EP | 0485934 A1 | 5/1992 |
| EP | 0772140 A1 | 5/1997 |
| EP | 0909057 A2 | 4/1999 |
| EP | 0977460 A2 | 2/2000 |
| FR | 1 543 492 | 10/1968 |
| GB | 2344963 A | 6/2000 |
| WO | WO 98/53399 A2 | 11/1998 |
| WO | WO 98/58313 A1 | 12/1998 |

OTHER PUBLICATIONS

"The International Search Report from International Application No. PCT/GB02/03338—dated Mar. 4, 2004, 10 pgs".

"UK Search Report from Application No. GB 0118377.1, dated Sep. 24, 2002, Relevant to Claims 85-88, (1 pg)".

"UK Search Report from Application No. GB 0118377.1, dated Sep. 24, 2002, Relevant to Claims 92-94, (1 pg)".

"UK Search Report from Application No. GB 0118377.1, dated Mar. 26, 2002, Relevant to Claims 1-84, 89-91 & 95-99, (1 pg)".

"Virtual Access Ireland Ltd: "Activator Service Controller: Applications" Internet Document, 'Online, Jul. 3, 2001, XP002260761", Retrieved from the Internet: URL:http//web.archieve.org/web/20010703091133/www.virtualaccess.com/products/controllers/apps.asp, retrieved on Nov. 7, 2003, p. 1-12.

Bray, Jacqueline A., "A Modeling Toolset For The Analysis And Design Of OSI Network Management Objects,", *Hewlett-Packard Journal, Hewlett-Packard Co*, Palo Alto, US, vol. 47, No. 5, XP000631665, (Oct. 1, 1996),43-51.

Cox, A D., "A Software Toolkit For Developing Telecommunications Application Components", *Hewlett-Packard Journal, Hewlett-Packard Co.*, Palo Alto, US, vol. 47, No. 5, XP000631667, (Oct. 1, 1996),62-69.

Shim, Y-C , "Developing A Managed System In A Telecommunication Management Network,", *1996 IEEE International Conference On Communications (ICC). Converging Technologies For Tomorrow's Applications*, Dallas, Jun. 23-27, 1996, *IEEE International Conference On Communications (ICC)*, New York, *IEEE*, US, vol. 1, XP000625634, (Jun. 23, 1996), 17-21.

Speaker, Lisa A., "A Toolkit For Developing TMN Manager/Agent Applications,", *Hewlett-Packard Journal, Hewlett-Packard Co.*, Palo Alto, US, vol. 47, No. 5, XP000631666, (Oct. 1, 1996),52-61.

International Search Report; PCT/EP02/06297; Sep. 18, 2002.

* cited by examiner

HARDWARE MODEL

PORT TABLE

| Name | Comment |
|---|---|
| PortOID | Unique identifier for each Port Type |
| Description | User friendly description of the Port Type |
| BaseInterfaceNumber | What number will logical interfaces on this Port be based at |
| Document_RES | Pointer to the documentation text for this Port Type |

Fig 3a

PORT TO CARD MAPPING TABLE

| Name | Comment |
|---|---|
| CardOID | Unique identifier for each Card Type |
| PortOID | Unique identifier for each Port Type |
| PortInstance | Instance of the port on the Card |

Fig 3b

CARD TABLE

| Name | Comment |
|---|---|
| CardOID | Unique identifier for each Card Type |
| ProductCode | Marketing Product Code for the Card |
| BoardRevision | Hardware Board Revision for the Card |
| BaseInterfaceNumber | What number will the logical interfaces on this card be based at |
| Document_RES | Pointer to the documentation text for this Card Type |

Fig 3c

CARD TO SLOT MAPPING TABLE

| Name | Comment |
| --- | --- |
| SlotOID | Unique identifier for each Slot Type |
| CardOID | Unique identifier for each Card Type |

Fig 3d

SLOT TABLE

| Name | Comment |
| --- | --- |
| SlotOID | Unique identifier for each Slot Type |
| Description | User friendly description of the Slot Type |
| Document_RES | Pointer to the documentation text for this Slot Type |

Fig 3e

SLOT TO CHASSIS MAPPING TABLE

| Name | Comment |
| --- | --- |
| ChassisOID | Unique identifier for each Chassis |
| SlotOID | Unique identifier for each Slot Type |
| SlotInstance | Instance of the Slot on the Card |

Fig 3f

CHASSIS TABLE

| Name | Comment |
| --- | --- |
| ChassisOID | Unique identifier for each Chassis |
| ProductCode | Marketing Product Code for the Chassis |
| BoardRevision | Hardware Board Revision of the Chassis |
| Document_RES | Pointer to the documentation text for this Chassis |

Fig 3g

CHASSIS TO HARDWARE MODEL MAPPING TABLE

| Name | Comment |
| --- | --- |
| HwModelOID | Unique identifier for each Hardware Model |
| ChassisOID | Unique identifier for each Chassis |
| ChassisInstance | Instance of the Chassis in the Hardware Model |

Fig 3h

HARDWARE MODEL TABLE

| Name | Comment |
| --- | --- |
| HwModelOID | Unique identifier for each Hardware Model |
| ProductCode | Marketing Product Code for the Hardware Model |
| Document_RES | Pointer to the documentation text for this Hardware Model |

Fig 3i

HARDWARE MODEL TO FAMILY MAPPING TABLE

| Name | Comment |
|---|---|
| FamilyOID | Unique identifier for each Hardware Product Family |
| HwModelOID | Unique identifier for each Hardware Model |

Fig 3j

FAMILY TABLE

| Name | Comment |
|---|---|
| FamilyOID | Unique identifier for each Hardware Product Family |
| Description | User friendly description of the Product Family |
| Document_RES | Pointer to the documentation text for this Product Family |

Fig 3k

SOFTWARE MODEL

ATTRIBUTE TABLE

| Name | Comment |
|---|---|
| Config_AttributeOID | Unique identifier within the Config_Component for each Configuration Attribute |
| Config_AttributeVersion | Version for this attribute, allows the properties of an attribute to evolve |
| Config_ComponentOID | Pointer back to the configuration component that holds these attributes |
| Config_AttributeType | Type of attribute |
| GUILabel_RES | User interface label for the Attribute |
| MinimumValue | Minimum value for the attribute |
| MaximumValue | Maximum value for the attribute |
| DefaultValue | Default value for attribute |
| DisplaySize | Display size on the user interface for the attribute |
| GUIPostfix_RES | Any text which should be appended after the user interface representation |
| GUIBriefHelp_RES | A brief one sentence help phrase for the attribute |
| SelectorName | Config_Selector name if this attribute type is SELECT |
| GUIDisplayOrder | Display order on the user interface |
| GUIAdvanced | Is this attribute on the advanced configuration form or the standard configuration form |
| Document_RES | Pointer to the documentation text for this configuration attribute |

Fig 4a

COMPONENT TABLE

| Name | Comment |
|---|---|
| Config_ComponentOID | Unique identifier for each Configuration Component |
| FeatureName | Name of the parent feature |
| Config_ComponentType | Type of Configuration Component (SYSTEM=system configuration component, INTERFACE=interface configuration component) |
| MaxNumElements | Number of elements that can be stored by this configuration component, equivalent to list size. |
| Title_RES | User interface title of the Configuration Component |
| Document_RES | Pointer to the documentation text for this configuration component |

Fig 4b

FEATURE TABLE

| Name | Comment |
| --- | --- |
| FeatureName | Unique identifier for this feature |
| Description | Short description of the feature |
| Document_RES | Pointer to the documentation text for this software feature |

Fig 4c

SOFTWARE VERSION TABLE

| Name | Comment |
| --- | --- |
| SwVersionOID | Unique identifier for each software version |
| Filename | Operating system filename corresponding to the filename of the software image |
| IdentityTag | String which describes the software version as it appears in the embedded device |
| SwVersionNumber | Actual version number of the software version |
| Description | User friendly description of the software version, appears on the Activator web interface |
| ActivationMechanism | The mechanism used to activate this device such as VAMP or TFTP |
| InterfaceStack | Management model for this software version, determines the interfaces available |
| TOCVersion | Which version of the table of contents does this software require |
| WebVersionOID | Identifier of the web version that accompanies this software |
| Document_RES | Pointer to the documentation text for this software release |

Fig 4d

ATTRIBUTE TO SOFTWARE VERSION MAPPING TABLE

| Name | Comment |
| --- | --- |
| SwVersionOID | Unique identifier for each software version |
| Config_AttributeOID | Unique identifier within the Config_Component for each Configuration Attribute |
| Config_AttributeVersion | Version for this attribute |

Fig 4e

SOFTWARE/HARDWARE INTERFACE MODEL

INTERFACE TABLE

| Name | Comment |
|---|---|
| InterfaceOID | Unique indentifier for this interface type |
| Description | User friendly description for this interface type |
| BaseInterfaceNumber | What number do logical interfaces of this type get based from |
| Document_RES | Pointer to the documentation for this interface type |

Fig 5a

INTERFACE STACK TABLE

| Name | Comment |
|---|---|
| MgmtModel | Unique identifier for the Management Model that this relationship is part of |
| LowerItfOID | Interface OID for the lower level interface |
| HigherItfOID | Interface OID for the higher level interface |
| MaxHigherItfInstances | How many instances of the higher layer interface can run on top of the lower |
| Description | User friendly description of this relationship |

Fig 5b

COMPONENT TO INTERFACE MAPPING TABLE

| Name | Comment |
|---|---|
| Config_ComponentOID | Unique identifier for each Configuration Component |
| InterfaceOID | Unique indentifier for this interface type |

Fig 5c

PORT TO INTERFACE MAPPING TABLE

| Name | Comment |
|---|---|
| PortOID | Unique identifier for each Port Type |
| InterfaceOID | Unique indentifier for this interface type |

Fig 5d

CONFIGURATION INFORMATION TABLE

| Name | Comment |
| --- | --- |
| ConfigOID | A unique value identifying a Device or Profile. Devices may be Standalone Devices or Profiled devices. |
| ConfigName | A descriptive name for the Device or Profile |
| ConfigType | Identifies whether the entity is a Profile, Profiled Device or Standalone Device. |
| SerialNumber | The serial number of the Device or Profile if any. |
| ProfileConfigOID | For Profiled Devices the ConfigOID of the Profile that this device is based on. |
| UserNotes | Free form text for user notes |
| ConfigState | Identifies the current state of the Device or Profile |
| SwVersionOID | Identifies the Version of the Software Binary that the corresponding real Device should run. Equals a value in the md_SwVersion.SwVersionOID column. |
| WebVersionOID | Identifies the Version of the Embedded Web Pages that the corresponding real Device should run. Equals a value in the md_WebVersion.WebVersionOID column. |
| HwModelOID | Identifies the Hardware Model of the corresponding real Device. Equals a value in the md_HwVersion.HwVersionOID column. |
| CheckedOutByUser | Identifies the user that has checked out this Device or Profile. Equals a value in the as_User.UserOID column or NULL if not checked out. |
| Recycled | Indicates whether the Device or Profile is in the recycle bin or not. |

Fig 6

DOCUMENTATION TABLE

| Name | Comment |
|---|---|
| Document_Res | Identifier for documentation |
| Language | Language to be used for localisation |
| Text | Documentation text |

Fig 7

EXTERNAL FORM TABLE

| Name | Comment |
|---|---|
| Config_AttributeOID | Unique ID for Configuration Attribute |
| Config_AttributeVersion | Version for this attribute |
| ExternalFormName | Identifier of the External form |
| ExternalForm | Actual external form |

Fig 8

SELECTOR TABLES

SELECTOR TABLE

| Name | Comment |
|---|---|
| SelectorName | Name of the parent Selector |
| SelectorVersion | What version of the Selector is this Element for |
| SelectorElementOID | Unique identifier of this Element |
| GUIDisplayOrder | User interface display order |
| GUILabel_RES | User interface label |
| SelectorValue | Internal value that is represented |
| Document_RES | Pointer to the documentation for Element |

Fig 9a

CONFIGURATION SELECTOR TABLE

| Name | Comment |
|---|---|
| SelectorName | Name of the selector |
| Document_RES | Pointer to the documentation for the Selector |

Fig 9b

SOFTWARE VERSION SELECTOR TABLE

| Name | Comment |
|---|---|
| SwVersionOID | Unique identifier for each software version |
| SelectorName | Name of the parent Selector |
| SelectorVersion | What version of the Selector is this Element for |
| SelectorElementOID | Unique identifier of this Element |

Fig 9c

CONFIGURATION DATA TABLE

| Name | Comment |
| --- | --- |
| ConfigOID | Uniquely identifies a device or profile. Must equal a value in the id_ConfigInfo table ConfigOID column. |
| VersionIx | Uniquely identifies a version of the FieldValue. |
| InterfaceIx | Identifies which interface this attribute is associated with. Equals a value in the id_Config$InterfaceInstance.ComputedInterfaceIx column. |
| ListIx | For attributes that are list items (ie there can be more than one of) identifies which list item this is. |
| Config_AttributeOID | Identifies the definition of the attribute. Equals a value in the md_Config_Attribute.Config_AttributeOID column. |
| FieldValue | A string containing the value of this version of the instance |
| IsPartOfQuickPage | A flag that indicates that this instance is a quick page attribute. If the ConfigOID identifies a Profile then this flag indicates the attribute is part of the Profiles Quick Page definition and the FieldValue is the default value to be used when creating a device based on the profile. If the ConfigOID identifies a Profiled Device then this field indicates that the FieldValue contains the final value to be used for the attribute for that device (ie the value that is entered when a device is created from a profile) |
| SynchStatus | This field is used to indicate whether the data in the database has been synchronized with the data in the corresponding real device out in the network. |

Fig 10

DEVICE CONFIGURATION AND MANAGEMENT DEVELOPMENT SYSTEM

CROSS-REFERENCE TO RELATED APPLICATIONS

This application claims the benefit of priority under 35 U.S.C. § 365(c) and § 120 to International Application Number PCT/GB02/03338, filed Jul. 23, 2002, published as WO 03/012635 A2, and under 35 U.S.C. § 119(a)-(d) or 365(b) to Great Britain Application Number 0118377.1, filed Jul. 27, 2001, all of which are hereby incorporated by reference herein.

The present invention relates to the development and/or management of configuration and management parameters for devices.

There is a need when developing devices for a management capability for the devices to be generated. Thus a device developer must devote some time to the task of providing management capabilities in a device. This is something that many developers dislike and can overlook. The responsibility usually falls to an administrator or manager to ensure that a management function is provided in the device by requesting certain management functions to be encoded in the device.

With the prevalent use of networked devices, the provision for both local and remote management has become essential for the proper functioning of a network. Networked devices can be used for a wide range of functions and it highly desirable to provide both local and central management.

In the prior art, the provision of both local and central management of devices is approached separately. A device developer is frequently required to provide certain management functions and does so by providing software for the device which provides an interface to the device e.g. over the network. An administrator or manager then provides a central management capability separately. This means that there is a fragmented approach to the management of the devices. There are two separate development groups, one providing local management and the other providing central management. This requires an increase in effort making it time consuming and expensive to create and maintain all the necessary documentation. Further coordination between the groups can be difficult and thus the maintenance of consistency and compatibility between the two ends of the management can be difficult. Further, developers who are normally responsible for influencing device features often do not understand the management requirements.

Thus in accordance with one aspect of the present invention, the present inventors have developed and end to end management solution which utilizes a common management data structure during the development, deployment, and use of managed devices. A common management model is used which can provide a common management interface.

One aspect of the present invention provides a device configuration system and method for developing and managing configuration and management information for devices. The system enables developers to develop configuration data and/or management data. Configuration and/or management data is stored as device data that is stored in accordance with a common management model. This enables the parameters and the management information to be managed. Parameters and management data entered in the common model can be output in a software product as a device management product which includes a parameters and management data for a set of devices. The device management product can thus be used to configure and manage a set of devices using the common management model. Each device has configuration and management data stored therein in accordance with the common management model. This provides for both central management and for local management using the common management model. In this way end to end management is provided.

Another aspect of the present invention provides a device configuration development system for developing and/or managing configuration and/or management information for devices. Device data structured in accordance with the common model of parameters relating to the configuration and/or management of the devices is stored. A developer interface allows a software developer to develop software for configuring and/or managing devices and to store device data in accordance with a common model. A device configuration and/or management software product for configuring and managing a set of devices is built by reading stored data for a set of devices structured in accordance with the common model. Device management and control software is configured for controlling a processing apparatus in a device manager to configure and/or manage the devices using the data for the devices included in the product and to provide the data for a device to the device to allow a local configuration and/or management at the device. The device management and control software can be included in the product or it can be already installed in the device manager processing apparatus.

In one embodiment of the present invention, the software product is built by reading and including in the software product the software developed by the software developer for loading onto devices for configuring and managing the devices.

In a preferred embodiment, the devices comprise network devices and the common model is a model of parameters relating to the configuration and management of the network devices which can be for example network configuration parameters e.g. network protocol capabilities.

In one embodiment of the present invention, the common management model comprises a model of hardware characteristics, software characteristics and relationships therebetween. This therefore provides a full picture of the characteristics of the device for management purposes.

In one embodiment of the present the device data comprises configuration data and meta data. The configuration data defines configuration parameters that can be set for the device. A configuration data can have configuration values that can be set by the developer or be settable by a manager centrally or by an operator of the device The meta data comprises management information for the configuration data and for the device.

In one embodiment the device data can include management data which includes interface information defining the configuration of a user interface to the device data i.e. defining a management interface. In this way, the meta data can define a common interface for central and local management. In one embodiment, for networked devices, the common user interface preferably comprises a web interface provided by a web server.

In one embodiment of the present invention, the device data can be copied to allow a developer to enter device data if the need arise by simply copying device data for another device which most closely resembles the new device to be developed and modifying the device data as necessary.

In one embodiment of the present invention, the developer interface means includes means for generating code stubs for management functionality from the device data for combination with the software provided by the software developer to control the device. Thus this capability provides encouragement for a developer to use the development system to enter the management data and the task of writing the code for the management functionality is removed from the developer. It is only necessary for the developer to interface the code stubs into their code by writing suitable interface code or 'glue'.

In one embodiment of the present invention, documentation for each device is stored. This can be stored as segments associated with respective parameters in the common model. Documentation for a device can be generated automatically by inserting management information from the management model into the documentation. Thus as management parameters are updated, the documentation is automatically updated. The documentation can be stored as document segments with each segment being associated with a respective parameter and having management parameters associated therewith. Thus documentation can be built up by incorporating management parameters into the documentation segments and aggregating the document segments to provide complete documentation for the device.

Within the common model, it is possible for the configuration parameters to identify a configured device comprising configuration data which is complete for a device or a configuration profile that includes some configuration data that can be input to complete or modify the configuration data for a device. For example, a number of configuration parameters could be set to a default value that can be altered by a user in order to modify the configuration data to provide a device profile. Thus in this way configuration parameters for a device can comprise configuration parameters from a configuration profile and user input configuration parameters. The configuration parameters from a configuration profile can be common to a large number of devices.

In accordance with another aspect, the present invention provides a management system or method for managing devices using the common management model. Data storage means stores management and configuration data for each device for managing and configuring the device. The management and configuration data is structured in accordance with the common management model i.e. in accordance with a common model of parameters related to the functioning and management of the devices. Means of communicating with the devices is provided in each device. Also the devices are provided with a copy of the management and configuration data for respective devices to provide for local management and configuration. Thus each device has a subset of the data in the common management model relevant for the management of the device. A device management means controls communications to and from the devices to provide central configuration of the devices and receipt of management data from the devices.

Thus in accordance with this aspect of the present invention, a device management system can be provided by the device development environment and the common management model can be used in both.

The device management system can, in one embodiment, provide the copy of the management and configuration data to each of the devices. In this way the management system can provide the initial configuration for the devices. This initial configuration can include the storage of code modules for controlling the devices for sending to and storing at the devices. The code module can be the same for the same type of device thus providing for not only common hardware but also common software for devices. The only difference between devices thus lies in the configuration and management data. This enables simple reconfiguration of devices by reconfiguration of their configuration and management data. No change of code is needed.

The configuration data defines configuration instances for devices. Also the configuration data can define a configuration profile for which some user definable configuration data can be entered or modified. This enables a configuration profile to apply to a set of devices and it enables a manager of the devices to assign configuration parameters individually only to the subset of the whole set of configuration data in order to provide a unique set of configuration data for a device.

Another aspect of the present invention provides a centrally managed device in which data for the device is stored and structured in accordance with a common model of parameters related to the functioning and management of devices managed by a central management system. The means for communicating with the central management system is provided under the control of the control means to control the sending of management data to the central management system.

In an embodiment of the present invention, the data comprises a set of configuration parameters and a set of management parameters. The management parameters are associated with respective configuration parameters and provide management information on the configuration parameters. Thus the management parameters comprise meta data for the configuration data.

In one embodiment the control means comprises a code module implemented by a processor in the device. The code module is downloadable from the central management system.

A further aspect of the present invention provides a device documentation generation system method in which meta data for each of the parameters defining characteristics of a plurality of devices is stored. The meta data is stored in accordance with a common data module for the devices. Documentation can be input for association with meta data for respective parameters and documentation for a device can be generated by incorporating the meta data into the documentation. In this way, as the meta data is changed i.e. the management information changes, the documentation is automatically updated.

In one embodiment, the documentation can be input as segments associated with respective parameters defining the characteristics of the device. The document generation then includes aggregating the appropriate document segments for appropriate parameters relevant to the device.

In one embodiment the meta data includes an indication of the language of the documentation to be generated for a device. The input documentation is stored and can comprise documentation in more than one language for a parameter. The documentation is then generated using the documentation in the language indicated by the indication in the meta data for the device.

A further aspect of the present invention provides a device configuration development system for developing control code for devices. A code store stores a library of code stubs for providing device management functions. A data store stores metadata on device configuration parameters, wherein the meta data comprises management information for the device configuration parameters. Meta data can be input into the data store and code stubs can be determined for a device to provide the management functionality defined in the input meta data using the library of code stubs in the code store.

Thus this aspect of the present invention enables a developer to merely input management information into the common database and receive in return code stubs for providing the management functionality to be incorporated within the developer's code for controlling the device.

A further aspect of the present invention provides a device management system and method for providing information defining a management interface for devices to provide for local and central management. Device data structured in accordance with the common module for the management of devices is stored. Information defining a management interface for devices is input for storage in the device data. The device data is output as a set of device data to provide a management interface for the central management of the set of devices and as device data for each data to provide the same management interface for the local management of each device.

A further aspect of the present invention provides a device configuration development system and method for developing and managing configuration and management information for devices. The required functionality of the devices is defined and desired attributes for management of the devices are entered. The entered attributes are stored as a central database for management of the devices and as a set of data in the devices for local management of the devices.

Any one of the aspects of the present invention described hereinabove can be used in combination with any ones of the aspects of the inventions hereinabove.

Any aspect of the present invention described hereinabove can be implemented in dedicated hardware, in a mixture of dedicated hardware and programmable hardware or in solely programmable hardware. The present invention can thus be embodied as programmable code for controlling a processor to carry out the processing steps. A carrier medium carrying the code is thus within the scope of the present invention. The carrier medium can either be a transient carrier medium or a storage carrier medium. A transient carrier medium can comprise a signal such as an electrical, optical, microwave, radio frequency or acoustic signal carrying computer code. An example of a transient carrier medium is a signal carrying computer code over the Internet (an Internet Protocol (IP) Network). The storage medium can comprise any conventional storage medium such as a floppy disk, hard disk, CD ROM, tape device, or solid state memory device.

Embodiments of the present invention will now be described with reference to the accompanying drawings, in which:

FIG. 1 is a schematic diagram of a hardware model used in accordance with an embodiment of the present invention, FIG. 2 is a schematic diagram of a software model used in an embodiment of the present invention, FIGS. 3a to 3k are tables illustrating the data structure of the hardware model in a relational database in accordance with an embodiment of the present invention, FIGS. 4a to 4e are tables illustrating the data structure of the software model in a relational database in accordance with an embodiment of the present invention, FIGS. 5a to 5d are tables illustrating the interfacing between the hardware model and the software module in a relational database in accordance with an embodiment of the present invention, FIG. 6 is a table providing information on configuration data, FIG. 7 is a table providing the documentation information for the parameters in the tables, FIG. 8 is a table giving information on the external form of attributes in the embodiment of the present invention, FIGS. 9a and 9c are selected tables used for identifying user interface selection options in accordance with an embodiment of the present invention, FIG. 10 is a table of the configuration data, FIG. 11 is a schematic diagram of a development system in accordance with an embodiment of the present invention, FIG. 12 is a flow diagram of the development process in accordance with an embodiment of the present invention, FIG. 13 is a flow diagram showing the development and management of the management information used for documentation in accordance with an embodiment of the present invention, FIG. 14 is a schematic diagram of a device management system in accordance with an embodiment of the present invention, FIG. 15 is a schematic diagram of the components of a device in which the components provide for central and local configuration and management of the device, FIG. 16 is a diagram showing the retrieval of management information, FIG. 17 is a diagram illustrating retrieval of parameters, FIG. 18 is a diagram illustrating the download of configuration data to configure the device, FIG. 19 is a diagram illustrating the configuration of a device, FIG. 20 is a diagram illustrating the implementation of a feature in a device, FIG. 21 is a diagram illustrating the retrieval of management information using a command line interface, FIG. 22 is a diagram illustrating the setting of a feature using the command line interface, FIG. 23 is a diagram illustrating the interfacing to the meta data using a command line interface, and FIG. 24 is a schematic diagram of the use of the configuration and management components as a ubiquitous interface to any device.

The present invention is built the premise of a common management model. The management model is common to:
1. The developer when developing the code for the device and the development managers,
2. The network manager (device manager) responsible for managing a network of devices, and
3. The devices that contain a set of the configuration and management data appropriate for the device.

Thus during the development phase, the developer and the development manager work on these same data which will end up on the devices and on the networked device managing system.

The common management model used is based on a meta data model. The meta data model comprises a hardware model, a software model and relationships therebetween. The model used and the data structure in accordance with the model will now be described.

FIG. 1 schematically illustrates the hardware model. A hardware model, defines a hardware model for a product that can comprise a number of chassis. Each chassis can have a number of slots into which can be placed a number of cards. Each card can have a number of ports.

Thus this is a hardware model of a network device having communication ports. Thus for example, the port can comprise an ISDN port, a ATM port, or an ADSL port as an port instance. The card can identify the capabilities of a card e.g, a ISDN card, a ATM card, or a ADSL card as a card instance. The slot identifies the type of slot provided in the chassis e.g. a ISA slot or a PCI slot as a slot instance. The chassis identifies a chassis instance having a particular chassis serial number. The hardware model will also be given a name identifying that hardware model as a hardware instance.

FIG. 2 is a schematic diagram of a software model. A software release or a software version all have a number of features, e.g. an IP (Internet Protocol) capability. Each feature will have components e.g. IPsys. Each component will have an attribute e.g. timeout.

Thus the hardware and software model define the characteristics of the system. Values for attributes can be set as configuration data in order to define a configuration instance for the device. This comprises the configuration data table (FIG. 10) that will be described in more detail hereinafter.

FIGS. 3a to 3k illustrate the data structure that is a series of relational database tables for the hardware model in an embodiment of the present invention.

FIG. 3a illustrates the port table. The port represents a physical port will have a connection to another real world entity. Information will be transferred across the port into the device. There are many different types of port and the type of port determines the type of connection associated with the port. A port is part of a card and a card can contain zero or many ports and thus a port type can have more than one instance. It is possible to run multiple logical interfaces over a single port. The set of logical interfaces available is determined by a combination of the port type and the software version running on the device.

The parameter PortOID defines a unique identifier for each port. BaseInterfaceNumber identifies a base number at which logical interfaces on this port will be based. Interfaces will be described in more detail hereinafter with reference to FIGS. 5a to 5d. Document_RES comprises a pointer to the documentation text for this port. The documentation table will be described in more detail with reference to FIG. 7.

FIG. 3b is a table for mapping ports to a card. Each card is uniquely identified together with each port. It is also possible for a port to have more than one instance on a card.

FIG. 3c is a diagram of the card table providing data for a card. Each card is uniquely identified by a parameter CardOID. Marketing product code for the card is also identified as well as a hardware board revision. The parameter BaseInterfaceNumber indicates the base number the logical interfaces on the card will be based at. There is also a pointer to the documentation text for the card. A card represents a physical card that is inserted into a device and provides a certain capability in the device. Most cards will contain additional physical ports for the device which will be used to interface the device for other devices.

FIG. 3d illustrates the card to slot mapping table which provides the link between the card table and slot table. This table simply provides pointers between the slots and the cards.

FIG. 3e illustrates the slot table providing data for each slot. A slot represents a physical slot that is present on a chassis. A slot is of a particular type and this determines the set of cards that are compatible with the slot. There are can be zero or more slots available on a chassis. Each slot is identified by a unique identifier and a description is provided of the slot. A pointer to the documentation text for each slot is also provided in the table.

FIG. 3f illustrates the slot to chassis mapping table to link the slots to the chassis. The table provides unique pointers between the slots and the chassis. Each slot can have more than one instance i.e. there can be more than one slot of the same type on the chassis.

FIG. 3g illustrates the chassis table. The chassis represents the physical chassis that can be inserted into a hardware model. The chassis is simply a carrier for slots into which cards can be inserted. A chassis is compatible with a particular model or set of hardware models. An example of a chassis will be a compact PCI chassis or a case for an ISDN router. Each chassis is uniquely identified by information on the marketing product code and hardware board revision is provided in the table. Also the unique pointer to the documentation text for the chassis is provided in the table.

FIG. 3h illustrates the chassis to hardware model mapping table. This maps the chassis to a hardware model. The table uniquely identifies the hardware and each chassis linking to the hardware model. A chassis can have more than one instance in the hardware model.

FIG. 3i illustrates the hardware model table. A hardware model represents an actual physical hardware model that is deployed by a named user. A model is simply a container for the chassis that will actually contain the hardware for the device. An actual hardware model could be an ISDN router or a cabinet rack that contains a specified set of chassis. The hardware model table contains a unique identifier of each hardware model together with the marketing product code for each hardware model. Also a pointer to the documentation text for the hardware model is included in the table.

FIG. 3j illustrates the hardware model to family mapping table that maps the links between a hardware model and a hardware product family.

FIG. 3k illustrates the family table. A hardware model family is intended to represent a collection of hardware models that are part of the same marketing product group. Each family is given a unique identifier together with a description of the product family. The table also contains a pointer to a documentation text for each product family.

It can thus be seen that FIGS. 3a to 3k provide a data structure to identify the hardware characteristics of a device with links to documentation for particular characteristics.

FIGS. 4a to 4e illustrate the tables forming the data structure of the software model.

FIG. 4a illustrates the attribute table that defines the attribute characteristics. A software configuration attribute represents a single configurable parameter that could potentially map to a particular structure or memory location in the device. From a configuration management point of view it is the values of the configuration attributes that must be stored to have a complete view of the parameters that are configured in the device. Configuration parameters are versioned so that changes in their default values, ranges and labels can be performed over the time. The history of an attribute can be kept so that the evolution of a parameter can be followed in an audit. The software version is made up of a collection of configuration attributes that describe the complete set of parameters configurable in the software version. As can be seen in FIG. 4a, an attribute is given a unique identifier together with a version number. Each attribute includes a pointer to the component that holds the attributes. The type of attribute is also identified. The type identifies the user interface type for the attribute. For example the attribute could be a SELECT type which means that it will be linked to a selector so that when the attribute is displayed, a drop down menu is displayed to allow the attribute value to be changed by selection from the menu. A user interface label for the attribute as well as minimum and maximum values and a default value for the attribute are also contained in the table. A display size on the user interface for the attribute and text that should be appended after the user interface representation for the attribute are also included in the table together with help text. The parameter SelectorName identifies a selector name that can be used in the user interface. This will be described in more detail hereinafter. The order of the attribute in the display is also identified by a parameter in the attribute table. The table further contains a pointer to the documentation text for the attribute.

Thus the attribute table contains meta data for an attribute. An attribute can have a value which will be held by a configuration data table as will be described in more detail with reference to FIG. 10. FIG. 4a stores meta data which can be used for management and for providing a management interface. The information regarding the user interface can be used by user interface code to generate a management user interface which is standard and common whether the data is being viewed centrally or at the device.

FIG. 4b illustrates the component table. A software configuration component acts as a view of configuration attributes. When generating an interface such as a web interface for a particular component, a single form can be created which displays all the attributes associated with the component. It is possible for a configuration attribute associated with more than one configuration component. This allows for multiple views of collections of attributes to be built up. Each component is given a unique identifier. Within the table each component has the name of the parent feature to link to the parent feature. The type of configuration component is indicated. The configuration component can either be a system configuration component or an interface configuration component. The concept of system and interface objects is based on the approach by SNMP modelers defined in RFC 1213 MIB-II. Interface objects relate to interfaces and can be both physical e.g. ports and logical e.g. protocols such as PPP and X25. System objects are system wide e.g. protocols such as IP, SNMP or TCP or software applications. The maximum number of elements that can be stored by the configuration component is also part of the configuration table and a user interface titled to the configuration component is stored. Further, there is a unique pointer to the documentation text for the configuration component.

It can thus be seen that the component table provides all the necessary information to provide a user interface comprising a single view of all of the attributes associated with the component and the user interface title will appear on such a user interface.

FIG. 4c illustrates the feature table. A software feature is a set of related component definitions. The feature table contains a unique identifier of the feature together with a short description of the feature and a pointer to documentation text for the feature.

FIG. 4d illustrates the software version table. The software version represents all of the information that is relevant to the meta data of that particular software release for a device type. An entry in this table represents an actual source code release from a device development team. Each software version is given a unique identifier in the table and its file name is identified. An identity tag which comprises a string which identifies the software version as it would appear in the embedded device is also contained within the software version table. A version number and user friendly description of the software version is further included in the table. The parameter ActivationMechanism defines the mechanism that will be used in the device to activate the software. The parameter InterfaceStack determines the interfaces that are available for the software version to link the hardware and software as will be described in detail hereinafter. The user interface provided in this embodiment of the present invention is a web interface and this requires a web server. Thus the parameter WebVersionOID identifies the web version which will accompany the software and be loaded on the device. The software version table also includes a pointer to the documentation text for the software version.

FIG. 4e illustrates the attribute software mapping table which links the software versions and each attribute provided by the software version.

FIGS. 5a to 5d illustrate the data tables for the interface model linking the software and hardware models.

Figure 1:
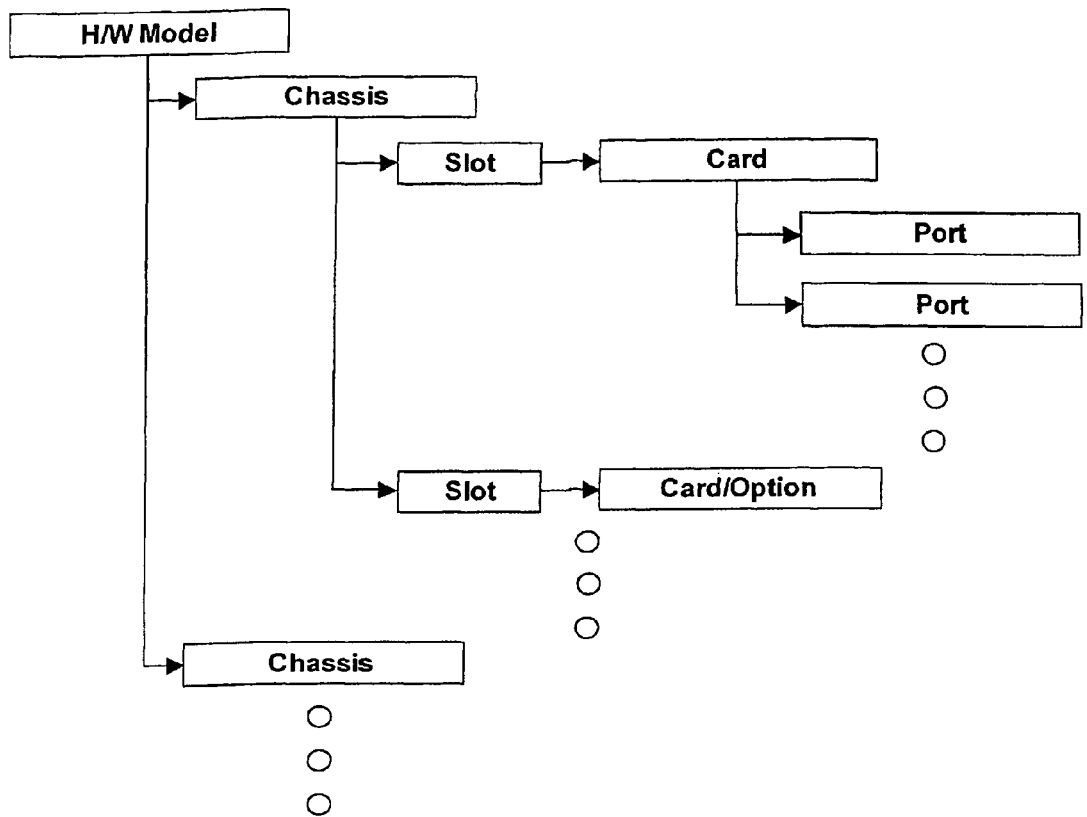
Figure 2:
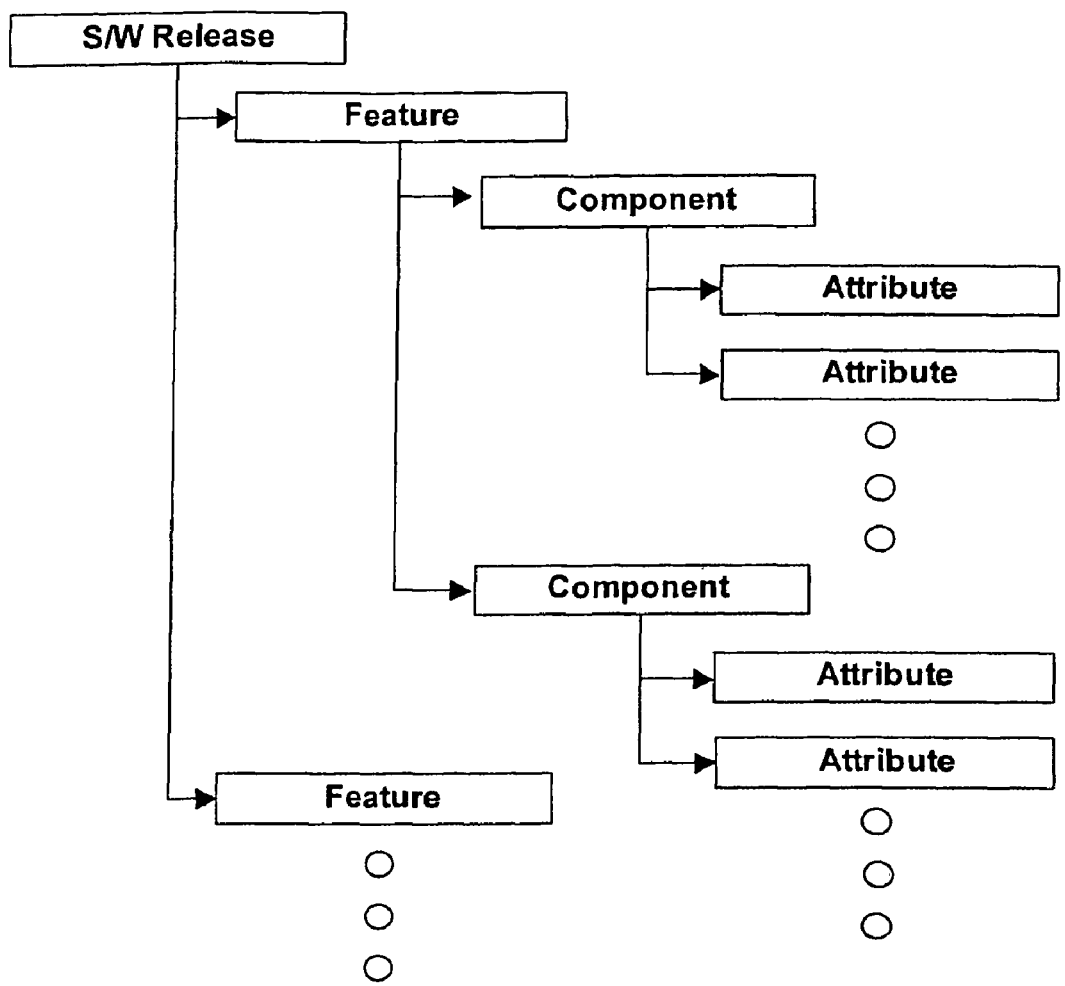

FIG. 5a illustrates the interface table. The logical interface represents the end of a logical connection over the device over a specific protocol. A logical interface can allow other logical interfaces to run over it to form a containment tree. Each logical interface is given a unique identifier and description. The logical interface is also given a number at which logical interfaces of that type are based on. Further, a unique pointer to documentation for the interface is also contained in the interface table.

FIG. 5b illustrates the interface stack table. This table illustrates the nesting of logical interfaces in a management model. The interface stack include a unique identifier of the management model that the relationship is part of. The lower and higher level interfaces are identified and how many instances of the higher layer interface can run on top of the lower layer interface. The table also includes a description of the relationship.

FIG. 5c illustrates the component to interface mapping table. These mappings indicate a set of constraints on the relationships rather than an actual assignment. For example an ISDN configuration object can be related to an ISDN type interface but not to an Ethernet type interface. In other words the mapping data indicates the maximal set of allowed mappings.

FIG. 5d illustrates the port to the interface mapping table in which a port is mapped to an interface.

Thus FIGS. 5a to 5d illustrate how ports and components can be mapped to interfaces that can be stacked. For example an interface can be an ISDN logical interface. An ISDN logical interface can support the Internet Protocol (IP) and the point to point protocol (PPP). Thus the software feature IP includes components such as IPsys and IP interface. Thus the interface stack can define the relationships between the port and the components in a stacked manner.

FIG. 6 illustrates the configuration information table. This table is not part of the metadata or development data. This data is the actual data or values for a configuration instance for a device. A configuration is assigned a unique value that can identify the complete configuration of a device or a profile configuration that can be used for configuring a family of devices. Devices can be stand-alone devices that have been configured completely or profile devices that can be configured from a profile by the insertion of specific configuration parameters to distinguish a specific device configuration. The configuration is given a name and the type of configuration is identified i.e. whether it is a profile, a profiled device or a stand alone device. Each configuration is given a serial number and for profiled devices, the identification of the profile on which the profiled device configuration is built is also stored in the table. The table further stores information on the current state of the device or profile. The current state indicates whether the configuration is in a pending state i.e. changes have been made, an accepted state where the configuration is available for use in a device, or active where the configuration has been used in a device. The parameter SwVersionOID identifies the version of the software to be assigned to the device. The software version has an attribute that identifies the software binary image that will be loaded on the device. WebVersionOID identifies the version of the embedded web pages that will run in the device. HwModelOID identifies the hardware model for the device.

FIG. 7 illustrates the documentation table containing the documentation text for devices. Each characteristic in the hardware and software model which includes a unique documentation identifier links to documentation in the documentation table. There is also a language field to enable the language of the documentation to be set.

FIG. 8 illustrates the external form table. This table defines the external form for attributes. The table identifies the attribute and the attribute version and gives an identifier for the external form to go with the actual form name. The external form defines the data syntax transformation. For example it can define a command line interface (CLI) string for the attribute for use by a CLI module in an embedded system in a device.

FIGS. 9a, 9b and 9c illustrate selector tables to provide drop down menus to allow a user to select parameters. Selector names are links from other tables to define the appearance and utility of a user interface.

FIG. 9a illustrates a selector table that gives the name of a selector and an identifier for the selector element. The user interface display order and label is contained within the selector table together with a value that is represented. There is also a unique pointer to the documentation for the element. A selector element represents an individual entry in an enumeration in a selector. Each selector represents one entry from a possible list of entries.

FIG. 9b illustrates a configuration selector table. A configuration selector represents an enumeration of values that can be set for a configuration command.

FIG. 9c illustrates the software version selector table. This table holds a unique identifier for each software version and identifies a selector parent and selector elements.

FIG. 10 illustrates a configuration data table. This data is not part of the metadata and it stores configuration data that comprises instances of attributes that belong to a device configuration or a profile configuration. Each configuration is given a unique ID and each configuration value is given a version number (VersionIx). The parameter InterfaceIx identifies which interface this attribute is associated with. The parameter ListIx enables more than one value for attributes. The attribute is identified using the parameter ConfigAttributeOID. The value is assigned as FieldValue. The parameter IsPartOfQuickPage indicates whether this configuration instance is an attribute that can be modified by a user to generate a profiled device configuration. The attribute meta data is used to form part of a display termed "a QuickPage". A QuickPage enables value (configuration parameters) to be input by modifying default values to complete a profiled device configuration. The QuickPage comprises a user interface to allow a user to enter the values for attributes. If the configuration ID indicates from the configuration information table (FIG. 6) that the configuration is a profile, then this flag indicates that the attribute is part of a "profiles QuickPage" definition and the FieldValue is the default value to be used when creating a device based on the profile. The value can however be changed by a user using the QuickPage. If the configuration ID identifies a profile device then this field indicates that the FieldValue contains the final value to be used for the attribute for that device.

The use of these data tables as a common set of configuration and management data will now be described.

Figure 11:
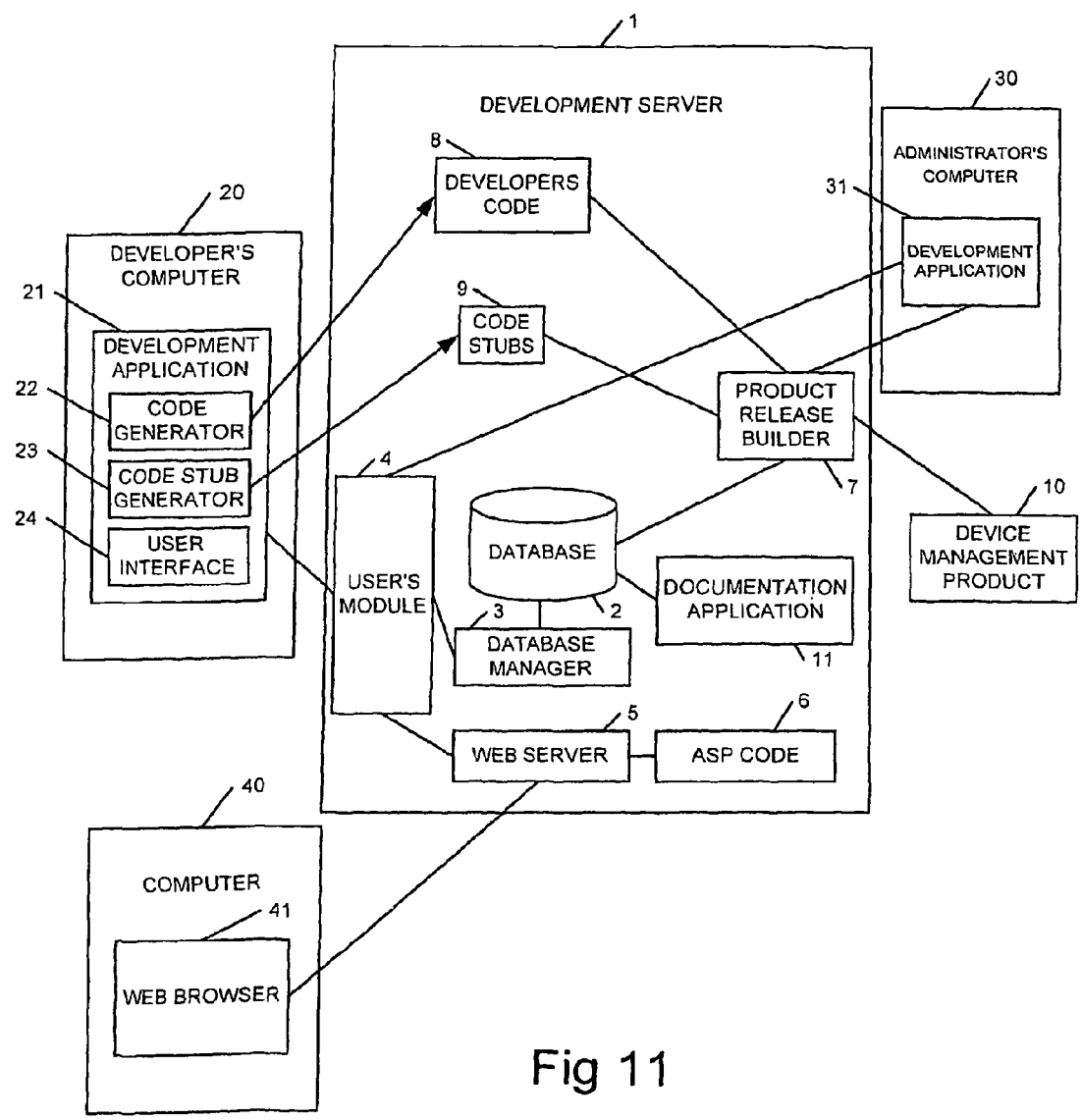

FIG. 11 is a schematic diagram of a development system for the development and management of configuration data and management data for devices. A development server 1 stores the data tables described hereinabove in a database 2 under the control of a database manager 3. The table that are stored in the development system are the metadata tables since no specific configuration instance data is generated. The generation of specific configuration instances is performed in the device manager and thus in the development system the configuration information table of FIG. 6 and the configuration data table of FIG. 10 are not stored in the database 2. A user's module 4 provides a gateway to the database for users and controls the type and level of access to the data A web server 5 is provided to use server side scripting such as active server page (ASP) code 6 or Java server page (JSP) code to provide a web interface to certain users. The web server 5 uses the ASP to generate web pages using data from the database 2. The data comprises the configuration data giving the values for attributes and the meta data defining the way the configuration data should be displayed. The development server 1 also includes a product release builder 7 for building a software product for release. Developers code 8 and code stubs 9 are also provided for building of binary code included in the product by the product release builder 7. Thus the product release builder 7 outputs a device management product 10. A documentation application 11 is provided for the generation of documentation for a device using the documentation included in the meta data stored in the database 2.

A developer's computer 20 in this embodiment is shown separately to the development server 1. The functionality can however be incorporated within the development server 1. The developer's computer 20 includes a development application 21 which can comprise a Java application running on a Java Virtual Machine. The development application includes a code generator 22 to allow a developer to generate code to provide functionality required of a device. A code stub generator 23 is also provided for the automatic generation of code stubs 9 for management purposes. The user interface 24 is also provided to allow the developer to interface to the application. The development application 21 thus enables the developer to generate developer's code 8 and code stubs 9. The development application 21 interfaces via the user's module 4 to the database manager 3 to gain access to the database 2 to thereby operate on the data structure as described hereinabove.

The administrator's computer 30 is illustrated in this embodiment as being separate to the development server 1. It can however be incorporated within the development server 1. Within the administrator's computer 30 a development application 31 is operated by the administrator to enable the administrator to access the database via the user's module 4 and database manager 3. Also the development application 31 controls the product release builder 7 to control the release of the device management product 10.

Other users of the system can gain access to the database 2 using the computer 40 hosting a web browser 41 to gain access via the web server 5, the user's module 4 and the database manager 3.

Thus the development system illustrated in FIG. 4 can be used by software developers using the developer's computer 20 to develop code for implementation on devices.

Also an administrator can control the information being entered into the database 2 to provide a management function to manage the configuration and management data contained within the database 2 and to control the release of a device management product 10. Other persons can gain access to the database 2 to contribute to the development of the data in the database. For example, a documenter can use the computer 40 in order to access the database 2 in order to add information into the documentation table as illustrated in FIG. 7. The access provided to the documenter can be controlled by the user's module 4.

A translator can gain access to the documentation in the documentation table as illustrated in FIG. 7 in order to input translations of documentation where necessary. Once again the functionality made available to the translator can be controlled by the user's module 4.

Figure 12:
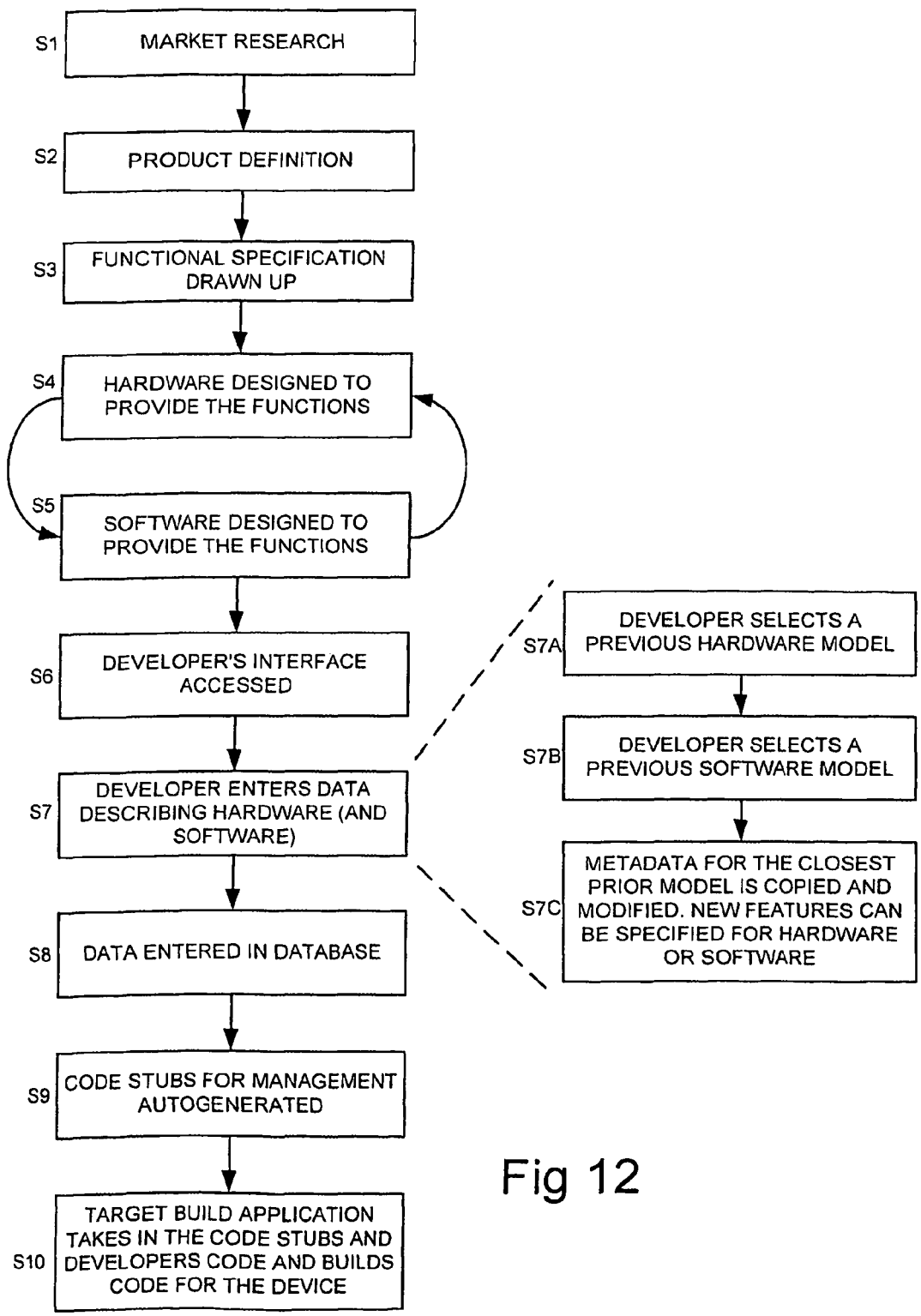

The steps performed during the development of a device will now described with reference to the flow diagram of FIG. 12.

Initially market research is carried out in order to determine product requirements (step S1). This results in a product definition (step S2) and a functional specification is drawn up (step S3). Following this hardware and software is designed to provide the functions (step S4 and S5). These steps can be carried out iteratively to arrive at the necessary hardware and software to perform the functions. During the design of the software, a developer can use a developer's application to access the database 2. The developer enters data describing hardware and software (step S7).

This can be achieved by selecting a previous hardware model in the database 2 (step S7a) and selecting a previous software model (step S7b) meta data for the previous model is copied and a new entry made in the database 2. The data can then be modified by the developer to modify the entries in the database to specify new hardware or software characteristics (step S7c). Thus in step S8 data is entered into the database. Code stubs to provide the management functions can then be automatically generated (step S9) and under the control of the administrator using the administrator's computer 30, the developer's code 8 and the code stubs 9 can be taken in by the product release builder 7 to build a management device product 10 (step S10). The product includes:

a. an installation application for installing the code onto a network management system,
b. configuration data and meta data for a set of products to be managed by the network management system, and
c. binary code for the devices to be managed (performed by combining the developer's code 8 and the code stubs 9), which includes metadata for the management and configuration of the device.

The software product is thus the code required for a new software release for a device and it includes meta data for the configuration and management of the device by a network (device) manager.

The network management code is a standard code that utilizes the metadata for managing and configuring devices and determined by the software release. The network management code can thus be provided separately or combined with the software release product for a device to allow the management and configuration of the device over a network.

Figure 13:
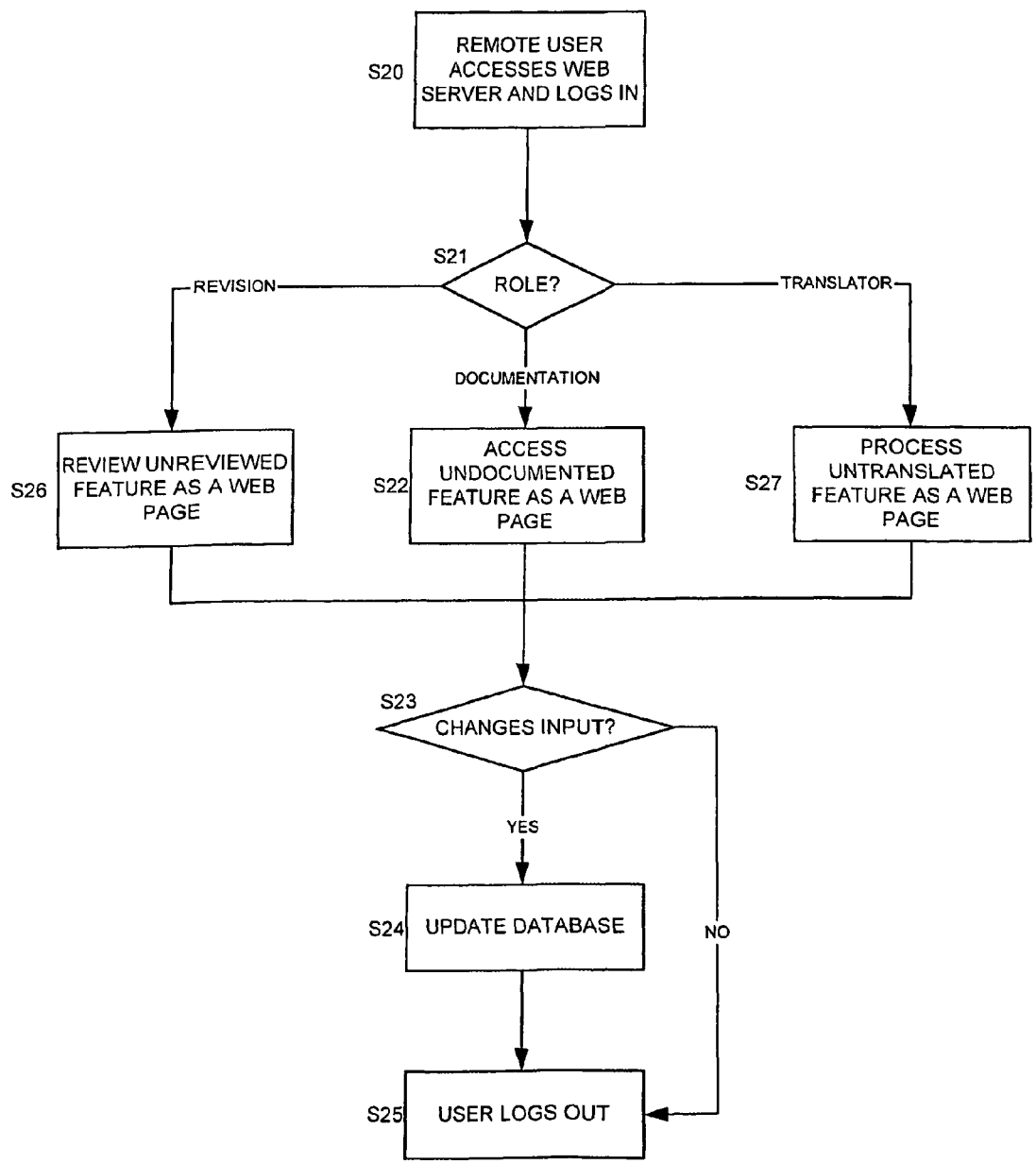

FIG. 13 is a flow diagram illustrating the process of managing and developing the configuration and management data in the database 2. In step S20 a user uses the computer 40 to access the web server 5 and logs in. The user's module 4 determines the role to be performed by the user (step S21). If a user is a documenter, the user can access undocumented features that are presented as a web page (step S22). The user is thus able to enter documentation for a particular features or characteristic so the software or hardware. If changes are made in the database (step S23), the database is updated in step S24 and the user can then log out in step S25.

If it is determined by the user's module 4 that the user is a reviewer, they are presented with a web page of unreviewed features (step S26) the reviewer can thus review the features and make any changes they feel its necessary. If the user's module 4 determines the user is a translator, untranslated features are presented to the user as a web page (step S27). The translator can thus enter translations as necessary.

It is thus apparent to the skilled person in the art that to arrive at the development process a common database is used by the developers and managers in order to provide configuration and management data for the devices. When the development process is complete, an administrator can cause the product release builder 7 to generate a management device product for the management of a set of devices. A device management product 10 can then be installed in a device management system to manage networked devices.

Figure 14:
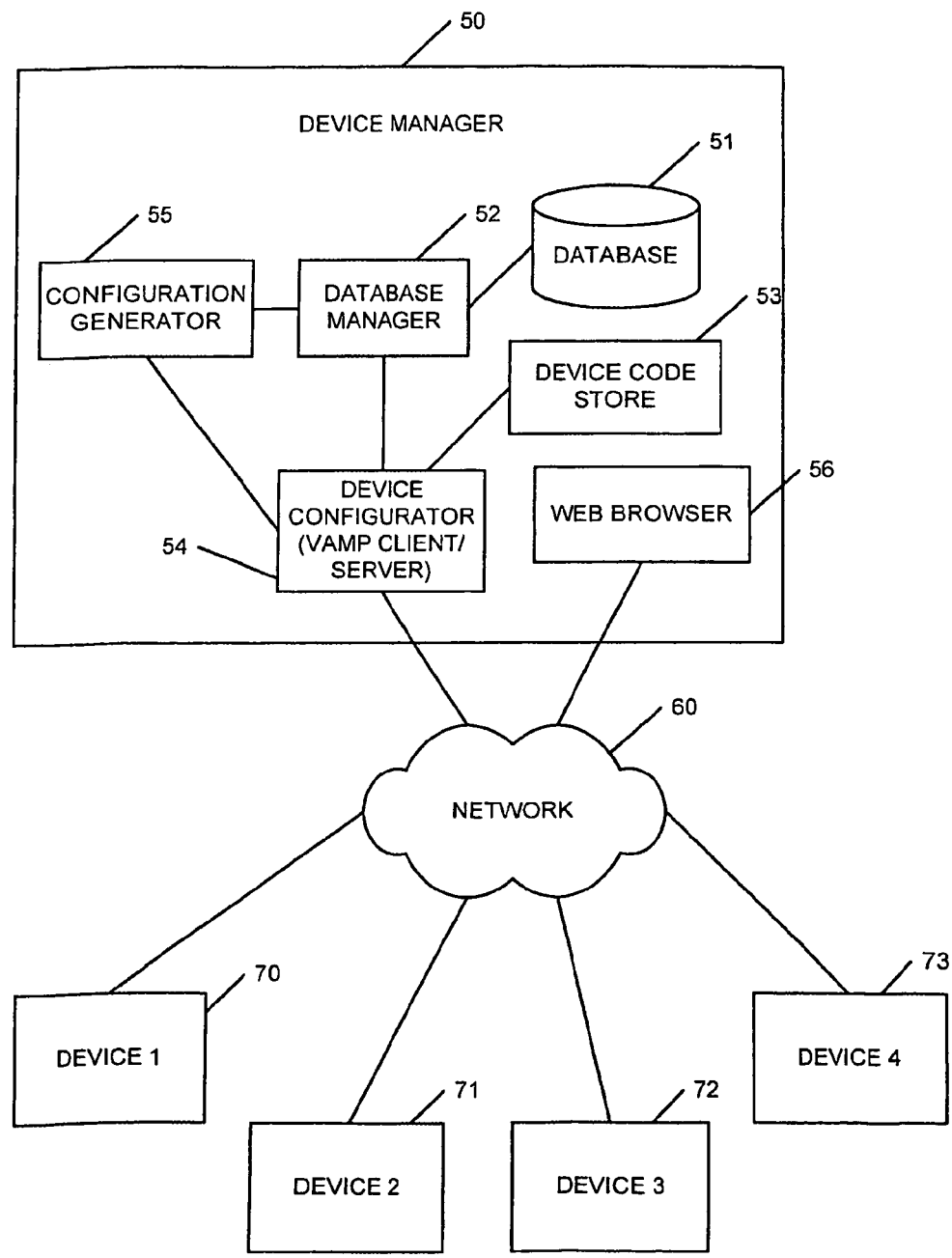

FIG. 14 is a schematic diagram of a network device management system in accordance with an embodiment of the present invention. When the device management product 10 is stored in a computer system, the device manager 50 illustrated in FIG. 14 is generated. The device manager 50 is connected over a network 60 to networked devices 70, 71, 72 and 73. The network preferably comprises an Internet Protocol (IP) network. Within the device manager there is a database 51 storing a copy of the data stored in the database 2 within the development system 1. The metadata tables are copied and also configuration instance tables (FIGS. 6 and 10) are set up to store configuration instances for devices. A database manager 52 controls access to the database 51. A device code store 53 stores binary code for each of the devices 70, 71, 72 and 73. A device configurator 54 (also termed a VAMP client/server) provides the connection over the network 60 to the devices 70, 71, 72 and 73. Thus the device configurator 54 can download the code stored in the device code store 53 to the devices 70, 71, 72 and 73 in order to provide the code for controlling the devices to provide the management function. The device configurator 54 can also access the database 51 via the database manager 52 in order to download a copy of configuration and management data to the network devices 70, 71, 72 and 73. The devices 70, 71, 72 and 73 need only store the configuration and management data relevant to the respective device. It is however configuration and management data that has been derived from the common data structure in databases 2 and 51 in the development system I and the device manager 50 respectively.

In this embodiment the device configurator 54 acts as both the web server and web client since the protocol used for communication over the network 60 to the devices 70, 71, 72 and 73 is preferable the hypertext transfer protocol (HTTP).

The device manager 50 also includes a configuration generator 55 for generating a complete set of configuration data i.e. the device configuration from a profile configuration. This enables the operator of the device manager 50 to configure multiple devices using a single profile. When a profile configuration is available, the user of the device manager 50 can use the configuration generator to select the profile and use it to generate a profiled device by entering parameters. This can be done by using a user interface termed a "Quick Page" to allow a user to enter the necessary parameters to distinguish the individual device. The Quick Page allows the default values of certain attributes in a profile configuration to be modified by the manager to provide the configuration comprising the profile device. The profile device configuration can then be downloaded to configure a device 70, 71, 72 or 73 by the device configurator 54. The manager can define new profile configurations by defining attributes which are part of the QuickPage.

Figure 15:
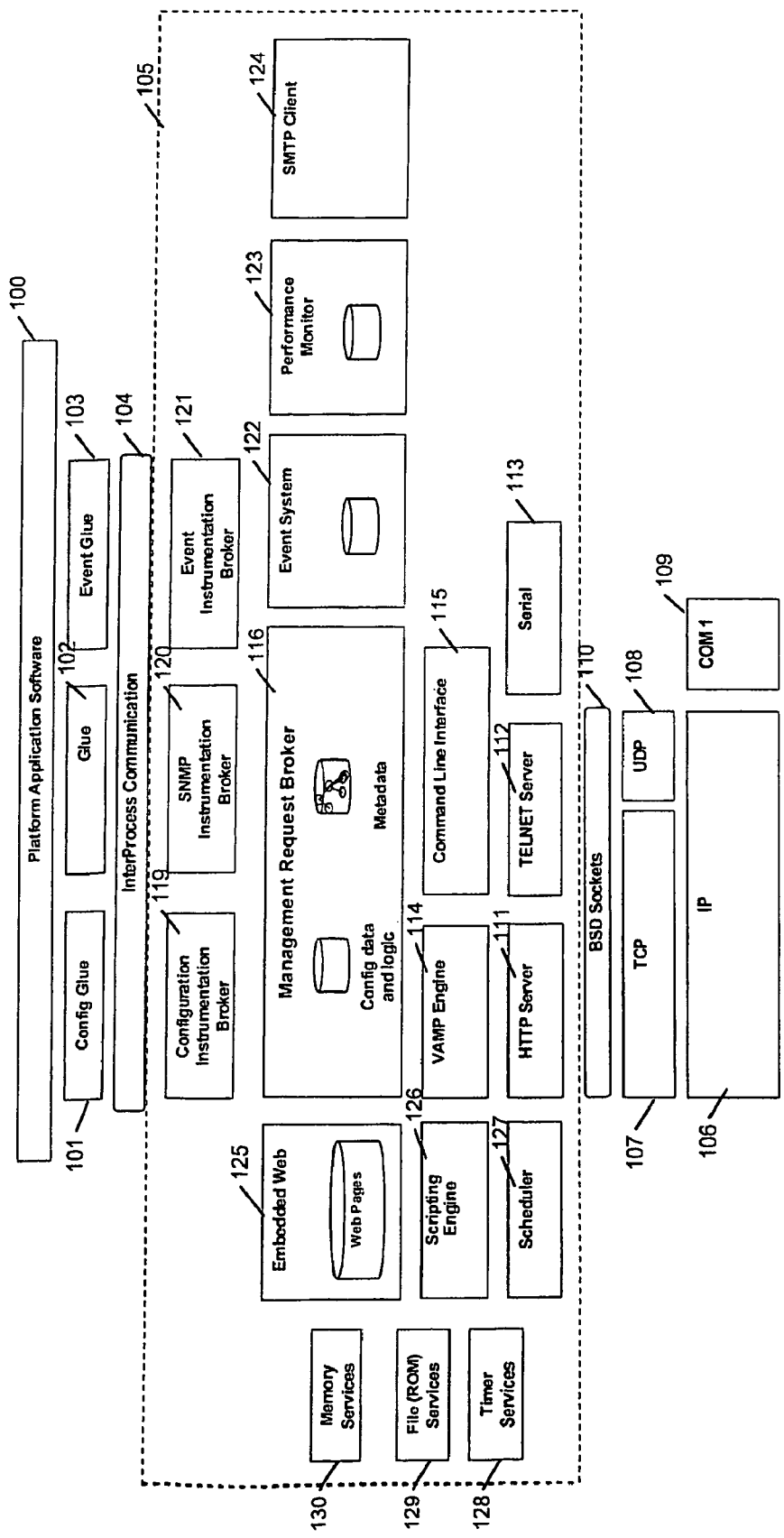

FIG. 15 schematically illustrates modules in the device to provide for local and central management of the device.

A platform application 100 to be configured and managed is interfaced via glue 101, 102 and 103 comprising code to an interprocess communication module 104 for communication with a portable communication module 105. A portable communication module 105 interfaces to BSD (Berkeley Distribution System) sockets. Within the device the communication protocol stack comprises Internet Protocol (IP) 106, Transmission Control Protocol (TCP) 107, and Unigram Data Protocol (UDP) 108 and a serial port 109 is provided to interface to the BSD sockets 110. The portable module 105 is the code that is common to all devices. Within the module 105 a web server 111, a TELNET server 112 and a serial interface 113 are provided. The device can communicate via HTTP using a VAMP engine 114. It can also communicate using the traditional command line interface 115 via the TELNET server 112 or serial interface 113. At the heart of the module 115 is a management request broker 116 that contains configuration data and logic and meta data for the configuration and management of the device. A configuration instrumentation broker 119 is provided in conjunction with the configuration glue 111 for communication to the platform application software 100. A Simple Network Management Protocol (SNMP) instrumentation broker 120 is provided in conjunction with the glue 102 for communication of instructions to or from the platform application software 100. The SNMP instrumentation broker 120 is provided to allow integration with SNMP agents running in the device. An event instrumentation broker 121 is provided in conjunction with event glue 103 to communicate events from the application software 100 into the embedded framework event management system.

An event system 122 monitors events and a performance monitor 123 monitors performance statistics. This enable the provision of event and statistic management information via the VAMP engine 114 in a management interface as a web page. A simple mail transfer protocol (SMTP) client 124 is provided to enable e-mail communication with the device.

Embedded web data 125 stores web information for the construction of web page interfaces as an interface to the device. A scripting engine 126 provides for scripting and a scheduler 127 schedules certain actions under the control of timer services 128.

Figure 16:
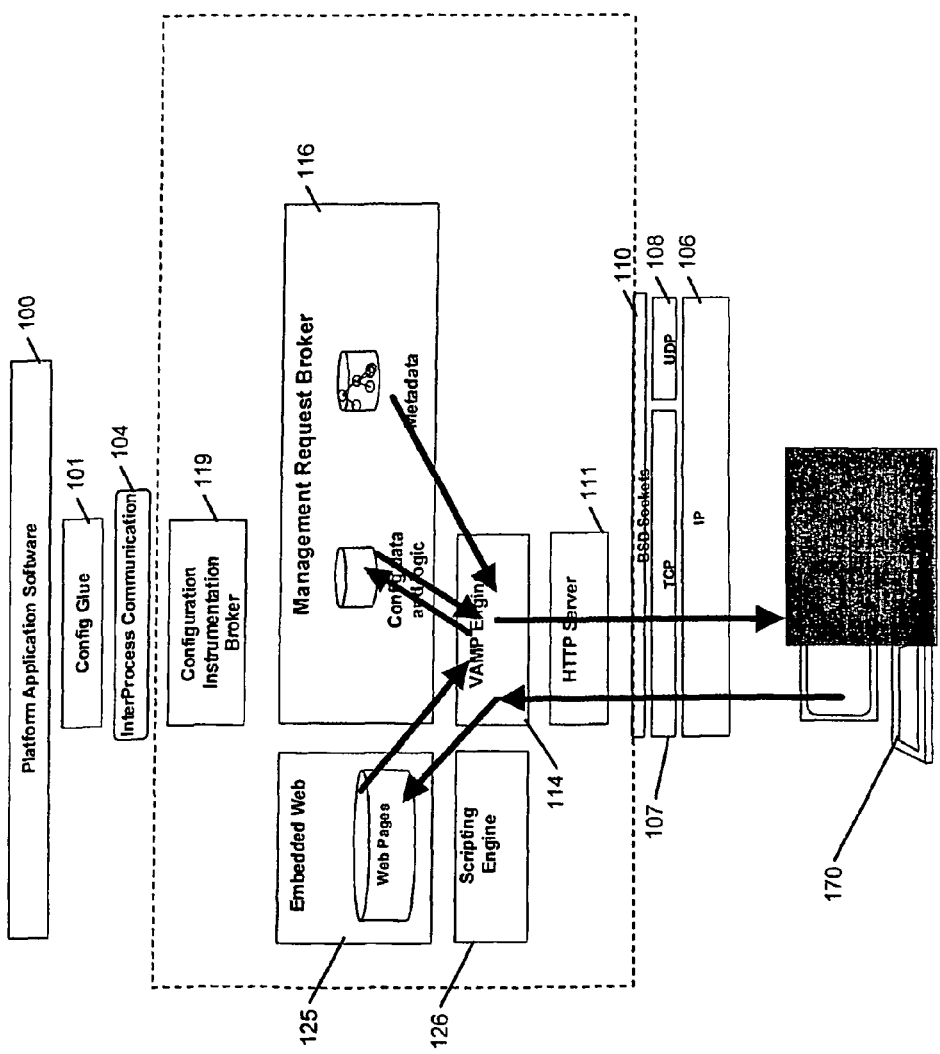

FIG. 16 illustrates the operation of the device acting as a web server to display management information in the form of a web page for a feature x.

The HTTP server 111 receives an HTTP get request for the web page for management information on feature x via the TCP/IP stack 106 and 107 from a web browser loaded on a computer 170. Computer 170 comprises can comprise any web enabled computer.

The request is passed on to a VAMP engine 114 to provide the management functionality. Embedded web information 125 is used by the VAMP engine 114 to construct the hypertext transfer mark up language (HTML) i.e. the web page to be returned. The VAMP engine 114 also requests information from the management request broker 116. The management request broker returns meta data which is used by the VAMP engine 114 to construct the web page. Thus the meta data stored by the management request broker 116 controls the user interface by configuring the form of the web page. The meta data can control the order in which items appear, the text to appear after items, and the language used. The management request broker 116 also returns configuration data which comprises the actual values for parameters. The web page constructed by the VAMP engine 114 is then returned to the computer 170 for display as a web page.

In this embodiment illustrated in FIG. 16, management request broker 116 is able to respond to the request for management information from the VAMP engine 114 using configuration data stored within the management request broker 116.

Figure 17:
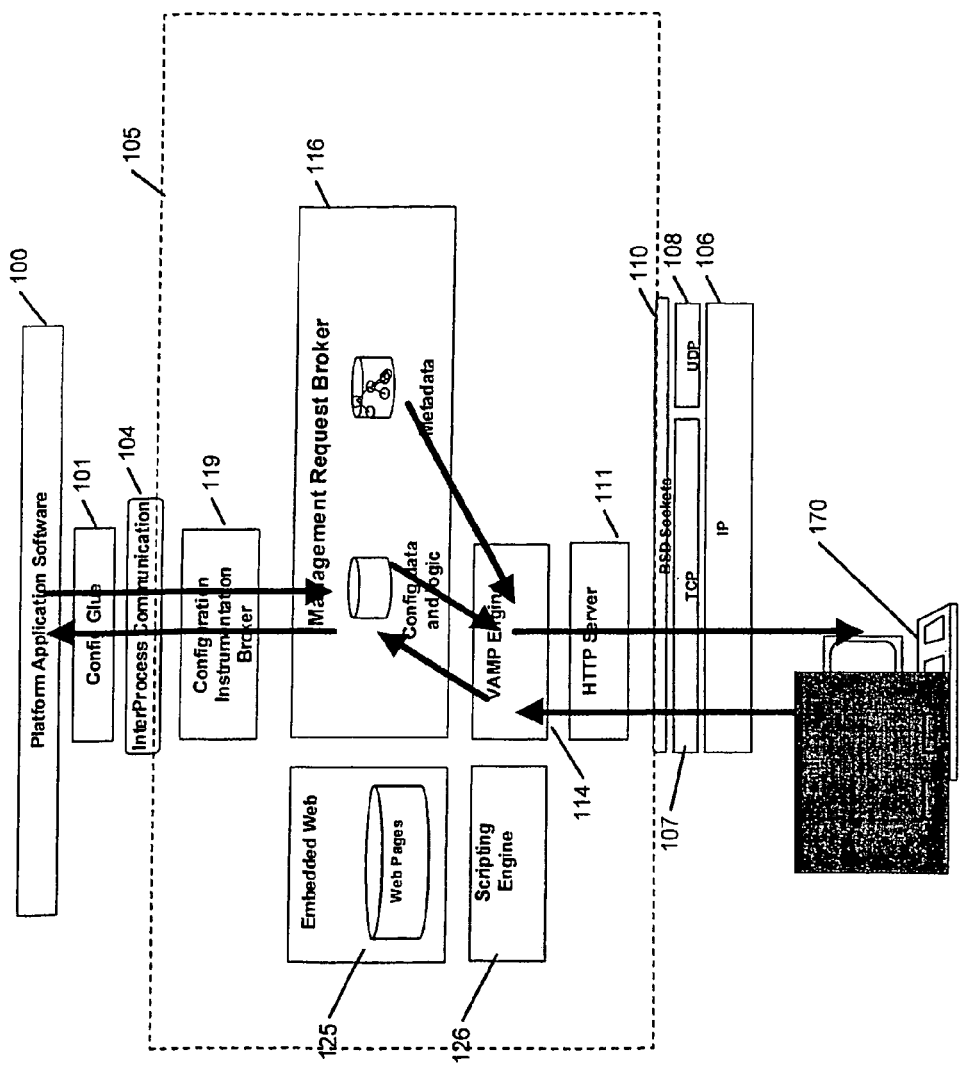

FIG. 17 illustrates an example where the management information required in the HTTP request from the computer 170 is not all contained within the configuration data within the management request broker 116. For example, the information required could include status data. In this embodiment the HTTP server 111 receives the request and passes to VAMP engine 114. The VAMP engine uses the meta data from the management request broker 116 to determine whether the information requested is present within the configuration data. If, using the meta data, it does identify that the attributes requested are present in the configuration data but must be obtained from the hardware platform on which the code module 1 15 is being implemented, a callback is invoked by the management request broker 116 through the configuration instrumentation broker 117, the interprocess communication 104 and the configuration glue 111 to the platform application software 100. The requested attribute information is returned to the management request programme 116 and passed on to the VAMP engine 114 for inclusion within the web page as described with reference to FIG. 16.

Thus in the embodiments of FIG. 16 and FIG. 17, a web page interface is provided for management information thus allowing local or remote access to management information on the network device.

In the embodiments illustrated in FIGS. 16 and 17, the scripting engine 136 stores code for the dynamic generation of web pages. However, it is possible also for static embedded web pages to be used.

Figure 18:
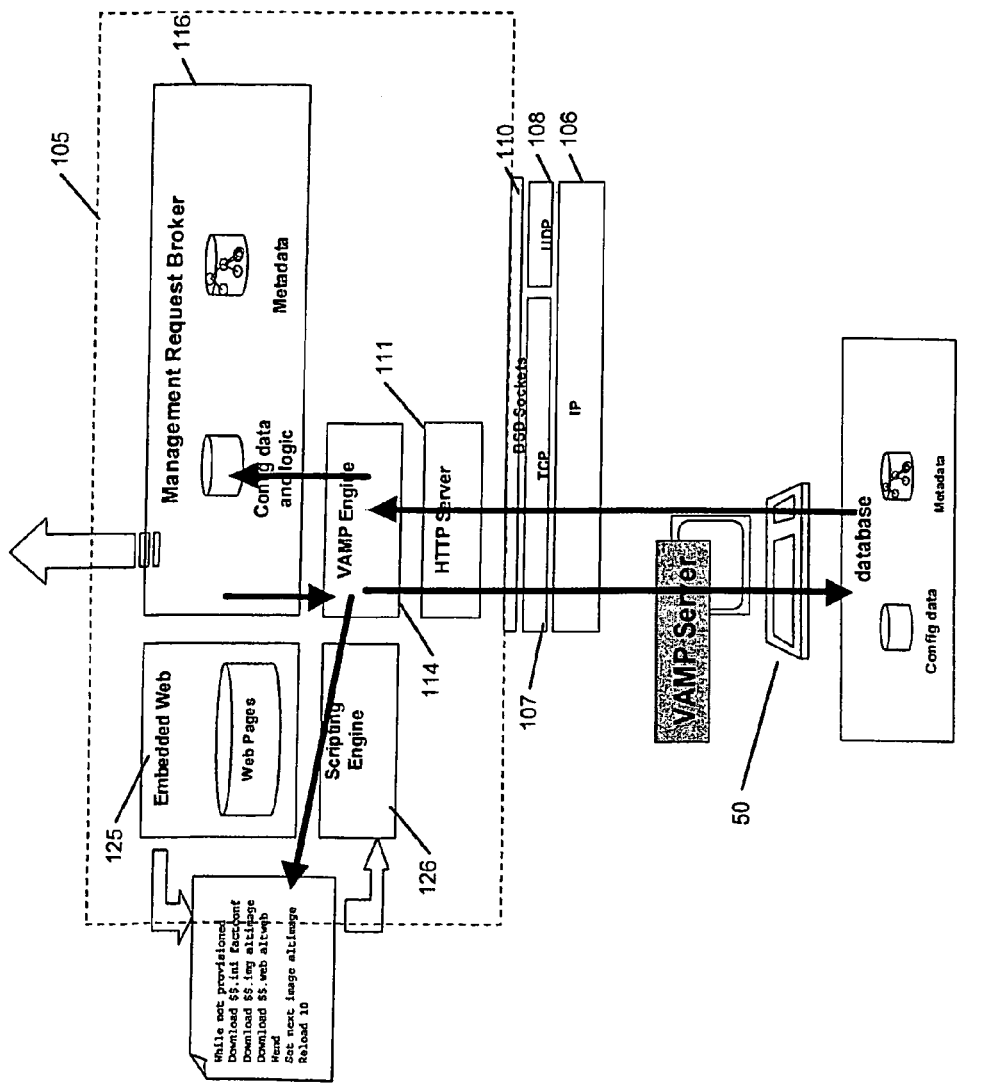

FIG. 18 is a diagram of the operation of the device when performing an auto provisioning function. When the device is in an initial factory configured state, the device executes a script within the scripting engine 136 which causes the VAMP engine 114 to control HTTP server 111 to generate and an HTTP get request to the VAMP server 54 in the device manager 50 for configuration and management information. The requested information is returned by the VAMP server 54 in the device manager 50 and is received at the VAMP engine 114 via the HTTP server 111. The VAMP engine 114 then stores the retrieved configuration and management data within the management request broker 116. It can also store downloaded web page data in the embedded web store 125. Thus in this way the device can be initially configured automatically.

Figure 19:
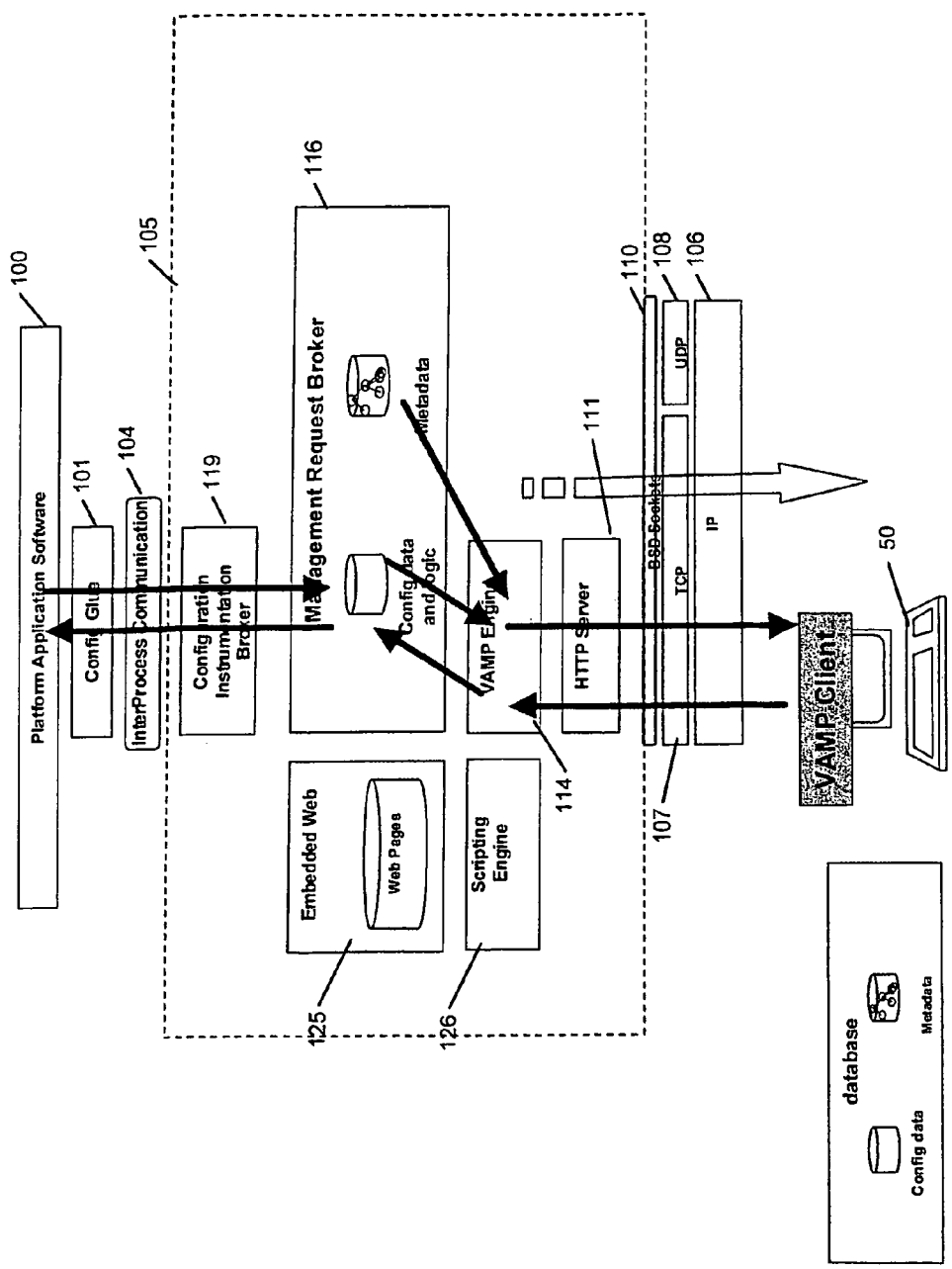

FIG. 19 is a diagram illustrating the modification of parameters under the control of the device configurator acting as a VAMP client 54 within the device manager 50. The VAMP client sends an HTTP request with attributes that are received in the VAMP engine 114 via HTTP server 111. The management request broker 116 invokes call backs into the application software 100 in order to attempt to modify an attribute in the platform application software 100. A response is then returned to the VAMP client 74 within the device manager 50 via the VAMP engine 114. The state of the object is then stored by the management request broker 116. Thus the management data is only updated if the request was successful e.g. if the request was to disable a circuit but the circuit was busy, the device will not action the request and the management data must reflect this.

The VAMP client 54 within the device manager 50 can also retrieve configuration data from the management request broker without performing the modification of the attributes in a similar manner to that described with reference to FIG. 19 except that no callback is invoked into the platform application software 100. Instead the configuration data is used to return the requested attributes as a HTTP response to the VAMP client 54 within the device manager 50.

Figure 20:
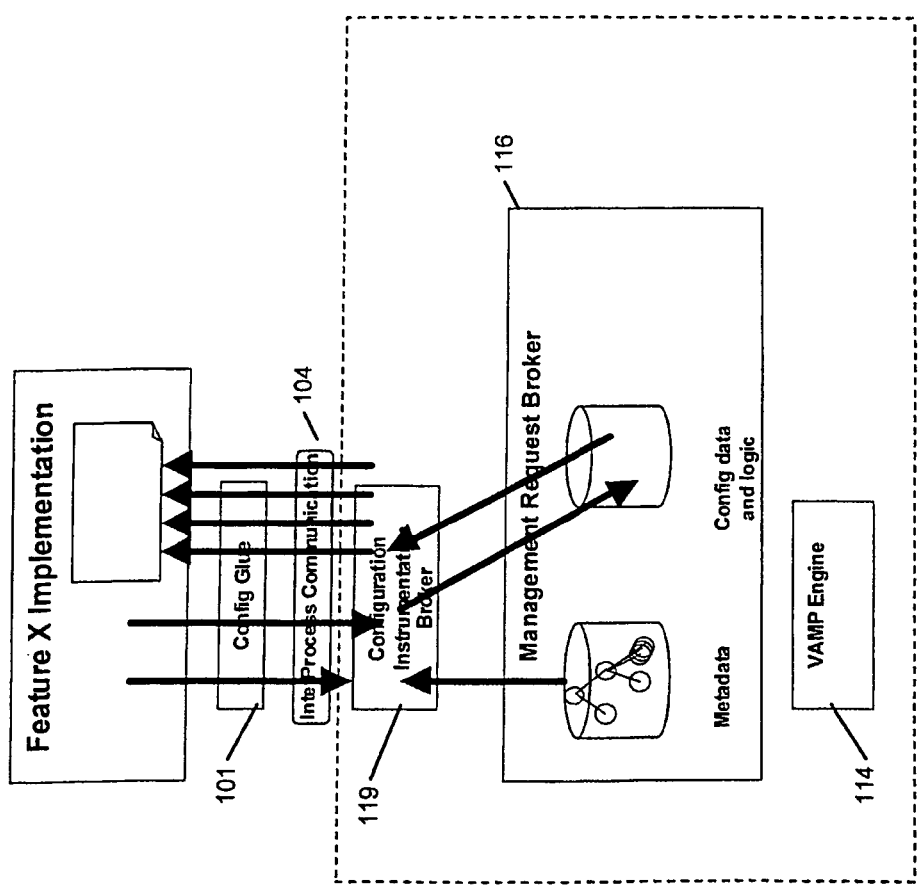

FIG. 20 illustrates the process of implementing or registering a feature in the device. The management request broker 116 includes meta data and configuration data for the feature. The configuration instrumentation broker 119 initiates the callbacks for the registration process in order to pass the necessary attributes. Thus using callbacks, the implementation of feature X can be configured in the device.

Figure 21:
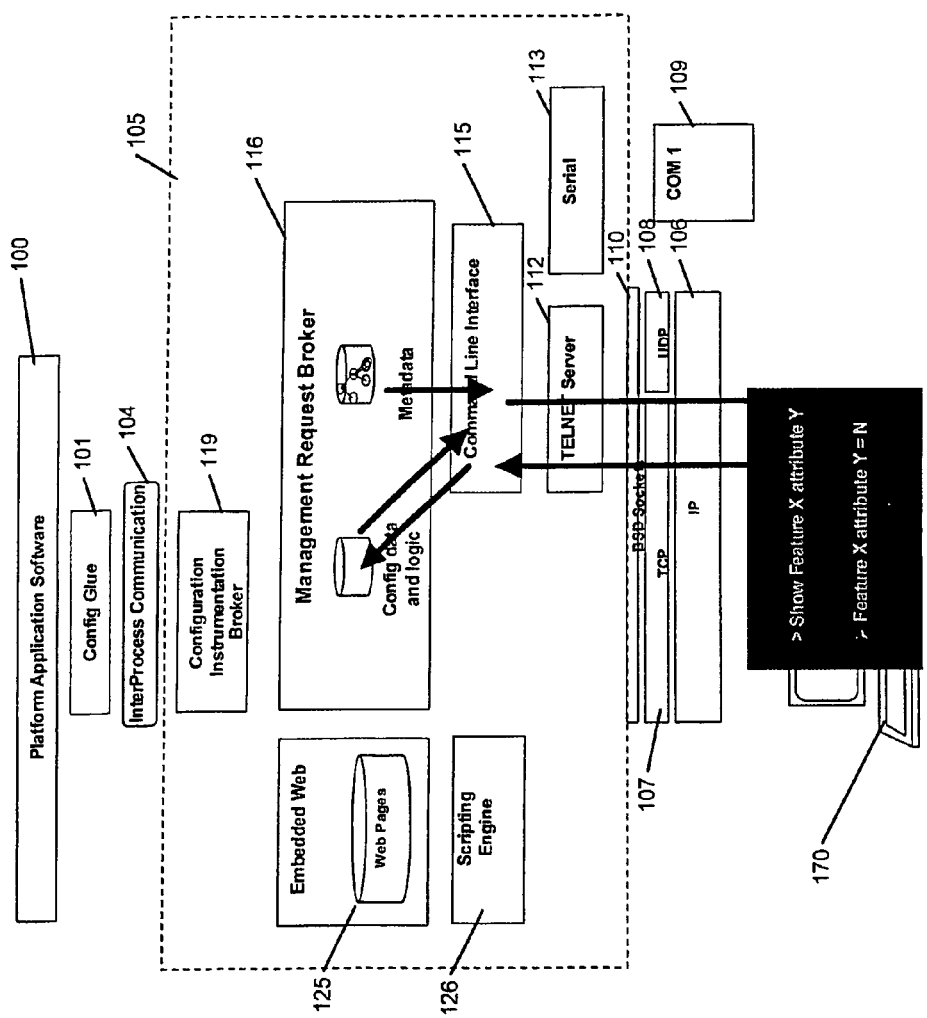

FIG. 21 illustrates the provision of a command line interface capability within the device to allow the fetching of attributes. A command line interface 115 is provided to enable a TELNET session to be used for communication with the device. In this embodiment a computer 170 establishes a TELNET session over the TCP/IP stack 106 and 107 with the TELNET server 112. The TELNET server 112 passes on the command line input to the command line interface 115. The command line interface 115 interacts with the management request broker 116 in order to determine if necessary responses can be provided from the configuration data using the meta data. The command line interface 115 then generates a text response that is passed by the TELNET server 112 as a response in the TELNET session to the computer 170.

Figure 22:
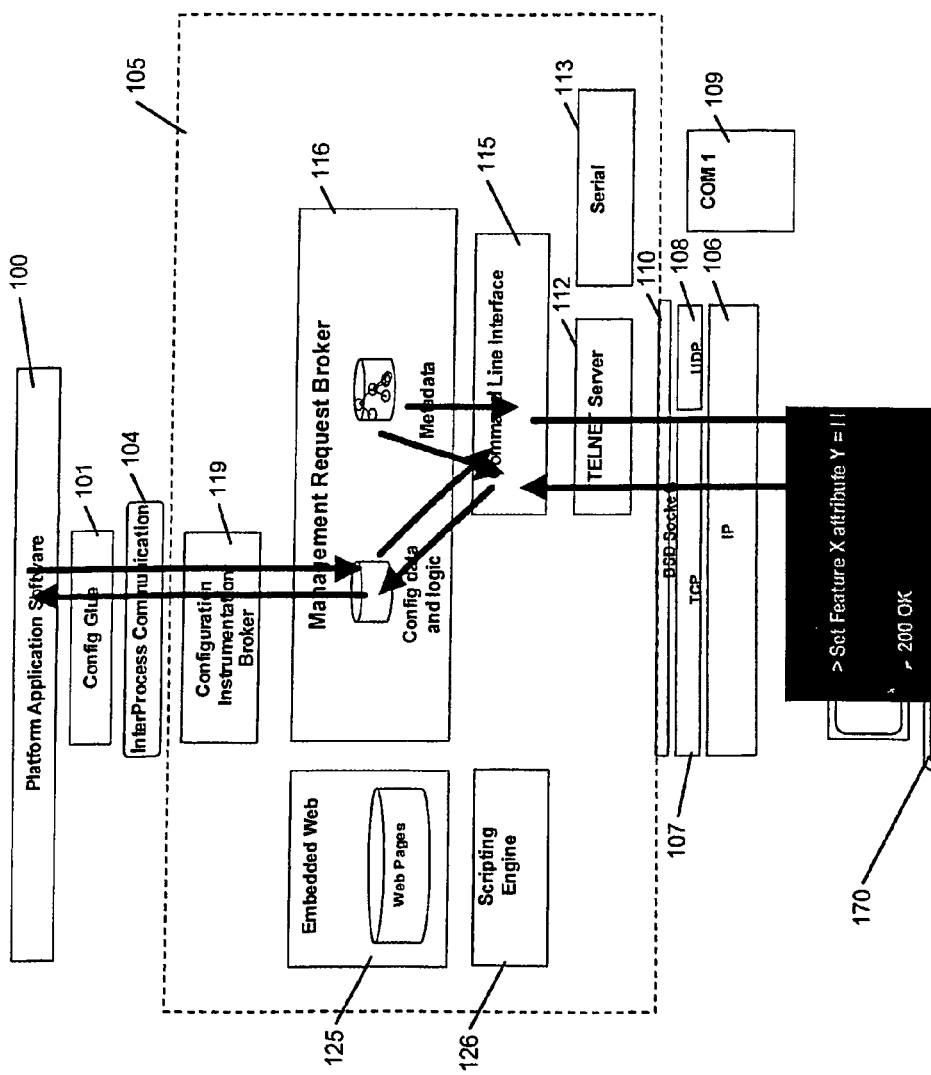

FIG. 22 illustrates the use of the command line interface 115 to modify attributes in the platform application software 100. A TELNET session is established by a computer 170 with the TELNET server 112 over the TCP/IP stack 106 and 107. The input attribute setting request is received by the command line interface 116 which uses the meta data to determine whether the response can be fulfilled by the configuration data. In this case it could not and a callback is invoked by the management request broker 116 through the configuration instrumentation broker 119 to the platform application software 100 in order to pass on the attribute modification. The response is received to confirm the modification and the command line interface 115 responds with an appropriate response that is passed by the TELNET server 112 to the computer 170.

Figure 23:
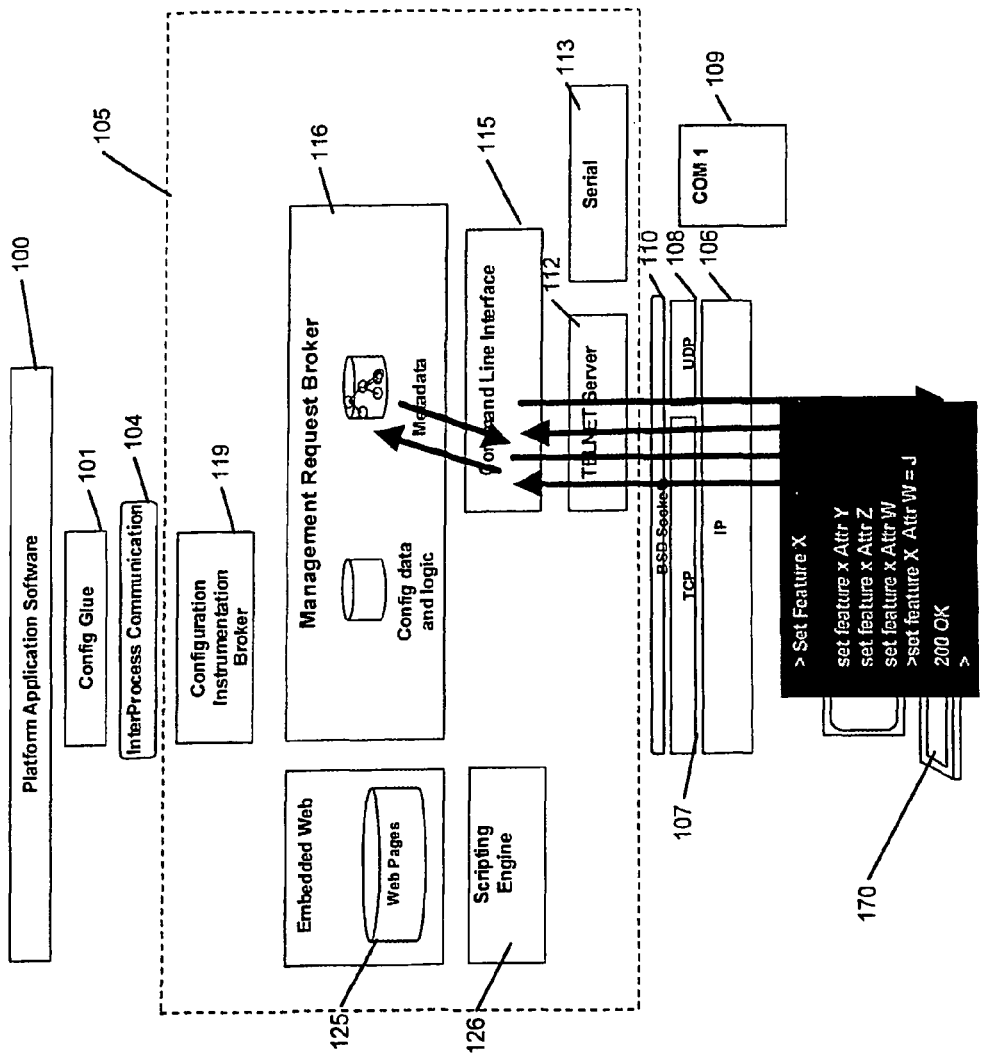

FIG. 23 illustrates the use of the command line interface for retrieving management information i.e. on-line help for users of the command line interface. A user types in a component name e.g. set feature X, but cannot remember the attribute. A request for information on feature X is sent as a command line instruction over a TELNET session on the computer 170 via the TELNET server 112 to the command line interface 115. The command line interface 115 retrieves the necessary information from meta data within the management request broker 116 in order to return the information. In this case the attributes for a component are the returned information. A user can select one to complete the command.

Figure 24:
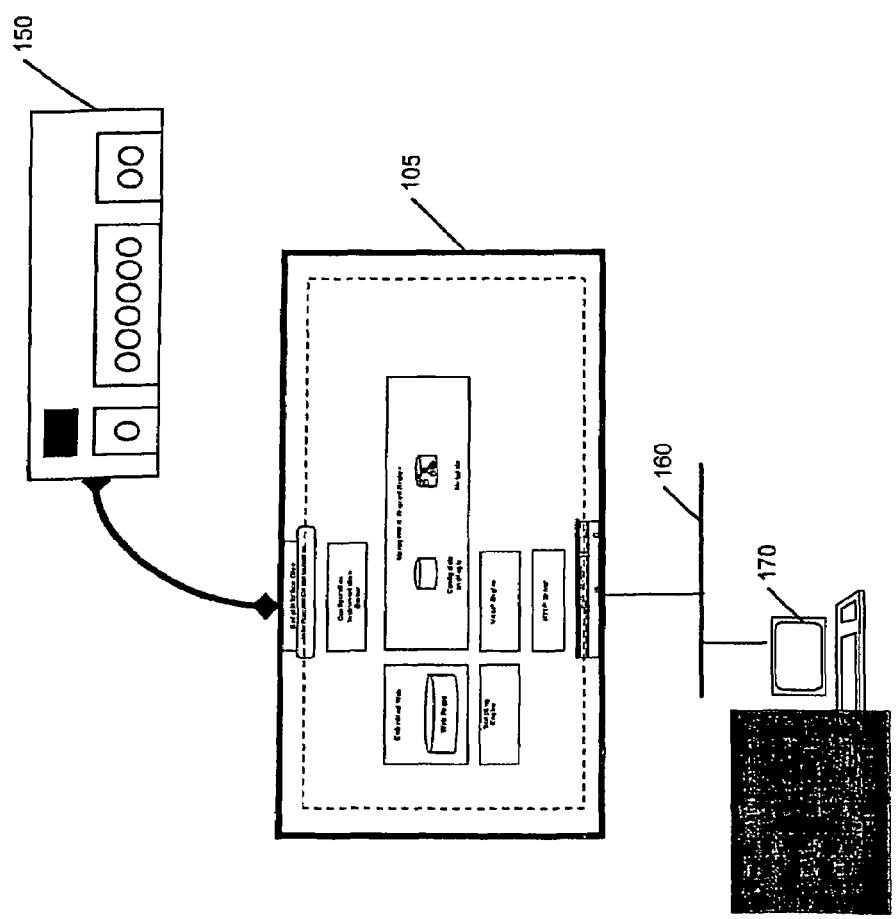

FIG. 24 is a schematic diagram illustrating the flexibility of the code module 115. This can be installed in any network device 150 to provide the management and configuration function. The management and configuration function can be provided by connecting a computer 170 using the web browser over the network connection 160 to interface to the code module 105. The code module 105 can either be loaded into the device 150 or can be provided on a separate physical device e.g. an internal card, or an external module.

This enables the provision of a web interface for existing products, providing a management and configuration function that can easily be accessed as web page data.

Although the present invention has been described hereinabove with reference to specific embodiments, it will be apparent to a skilled person in the art that modifications lie within the spirit and scope of the present invention.

The present invention is application to any device that can be managed centrally such as a networked device.

The management data can comprise any function or parameters that require monitoring or control. The management parameters can include statistics, notifications from the devices, device performance parameters, and/or device status parameters.

The invention claimed is:

1. A device information development system for developing and managing configuration and/or management information for devices, the system comprising:
    data storage means storing device data structured in accordance with a common model of parameters related to the configuration and/or management of the devices;
    developer interface means for allowing a software developer to develop software for configuring and/or managing devices and to enter device data into the data storage means in accordance with the common model;
    software product building means for building a device configuration and/or management software product for configuring and/or managing at least one device, the software product building means being adapted to build the software product by reading data for at least one device from the data storage means structured in accordance with the common model for use by device management and control software to control a processing apparatus to configure and/or manage the devices using the data for the devices included in the product and to provide the data for a device to the device to allow local configuration and/or management at the device; and
    software storage means storing device management and control software for at least one of configuring and managing a device, wherein said software product building means is adapted to build the software product to include the device management and control software.

2. A device information development system according to claim 1, wherein the devices comprise network devices and the common model is a model of parameters related to the configuration and/or management of the network devices.

3. A device information development system according to claim 1, wherein the parameters related to the configuration and/or management of the devices are suitable for central remote management of the devices and local management of each device.

4. A device information development system according to claim 1, wherein the common model of parameters related to the configuration and/or management of the devices comprises a model of hardware characteristics, software characteristics and relationships therebetween.

5. A device information development system according to claim 1, wherein said device data comprises configuration data and metadata, the metadata comprising management information for the configuration data and for the device.

6. A device information development system according to claim 1, wherein the device data includes interface data defining the configuration of a user interface to the device data.

7. A device information development system according to claim 6, wherein the interface data defines the configuration of each element of a user interface related to the display and/or input of a configuration parameter and/or management parameter.

8. A device information development system according to claim 6, wherein the interface data defines a management interface for configuring and/or managing the device and/or the device data.

9. A device information development system according to claim 6, including user interface means for providing an interface to a user using the interface data.

10. device information development system according to claim 9, wherein the user interface means comprises a web server means for providing the user interface as a web page.

11. A device information development system according to claim 1, wherein the developer interface means is adapted to allow a developer to enter device data for a new device by copying device data for another device and modifying the device data.

12. A device information development system according to claim 1, wherein the developer interface means is adapted to generate code stubs for management functionality from the device data for combination with software provided by the software developer to control the device to develop the software for configuring and/or managing the devices.

13. A device information development system according to claim 1, wherein the database storage means comprises a relational database storage means.

14. A device information development system according to claim 1, wherein the common model is an object model comprised of hardware objects, software object, and interface objects linking the hardware and software objects.

15. A device information development system according to claim 1, including documentation storage means for storing documentation segments associated with respective parameters of the common model, and documentation input means to allow the input of documentation segments for association with respective parameters of the common model.

16. A device information development system according to claim 15, including documentation generation means for generating documentation for a device by combining the stored document segments for parameters related to the configuration and/or management provided for the device.

17. A device information development system according to claim 1, wherein the common model includes a parameter to identify a configured device having configuration data for all configuration parameters, and a configuration profile for which some configuration data can be input to complete or modify the configuration data for a device.

18. A device information development system according to claim 17, wherein the common model includes a parameter to identify a configured device having some configuration data entered by a user and some configuration data provided from the partial configuration.

19. A device information development system according to claim 1, comprising a processing system, wherein the data storage means comprises a relational database, the developer interface means comprises a developer computer application implemented on the processing system, the software storage means comprises a storage device, and the software product building means comprises a software builder computer application implemented on the processing system.

20. A device information development method for developing and/or managing configuration and/or management information for devices, the method comprising:
providing a database storing device data structured in accordance with a common model of parameters related to the configuration and/or management of the devices;
entering device data into the database in accordance with the common model when a software developer develops software for configuring and/or managing devices; and
building a device configuration and/or management software product for use in the configuration and/or management of at least one device by including in the software product the data for a set of devices from the database store structured in accordance with the common model in the database for use by device management and control software to control a processing apparatus to configure and/or manage the devices using the data for at least one device included in the product and to provide the data for a device to the device to allow local configuration and/or management at the device, wherein device management and control software is built into at least one of the device configuration and management software product.

21. A device information development method according to claim 20, wherein the devices comprise network devices and the common model is a model of parameters related to the configuration and/or management of the network devices.

22. A device information development method according to claim 20, wherein the parameters related to the configuration and/or management of the devices are suitable for central remote management of the devices and local management of each device.

23. A device information development method according to claim 20, wherein the common model of parameters related to the configuration and/or management of the devices comprises a model of hardware characteristics, software characteristics and relationships therebetween.

24. A device information development method according to claim 20, wherein said device data comprises configuration data and metadata, the metadata comprising management information for the configuration data and for the device.

25. A device information development method according to claim 20, wherein the device data includes interface data defining the configuration of a user interface to the device data.

26. A device information development method according to claim 25, wherein the interface data defines the configuration of each element of a user interface related to the display and/or input of a configuration parameter and/or management parameter.

27. A device information development method according to claim 25, wherein the interface data defines a management interface for configuring and/or managing the device and/or the device data.

28. A device information development method according to claim 25, including generating an interface to a user using the interface data.

29. A device information development method according to claim 28, wherein the user interface is generated as a web page.

30. A device information development method according to claim 20, wherein device data for a new device is entered by copying device data for another device and modifying the device data.

31. A device information development method according to claim 20, including generate code stubs for management functionality from the device data for combination with software provided by the software developer to control the device to develop the software for configuring and/or managing the devices.

32. A device information development method according to any one of claims 20 to 31 wherein the database comprises a relational database.

33. A device information development method according to claim 20, wherein the common model is an object model comprised of hardware objects, software object, and interface objects linking the hardware and software objects.

34. A device information development method according to claim 20, including inputting and storing documentation segments associated with respective parameters of the common model.

35. A device information development method according to claim 34, including generating documentation for a device by combining the stored document segments for parameters related to the configuration and management provided for the device.

36. A device information development method according to claim 20, wherein the common model includes a parameter to identify a configured device having configuration data for all configuration parameters, and a configuration profile for which some configuration data can be entered to complete or modify the configuration data for a device.

37. A device information development method according to claim 36, wherein the common model includes a parameter to identify a configured device having some configuration data entered by a user and some configuration data provided from the partial configuration.

38. A storage medium storing computer readable code for controlling a computer to developing and/or managing configuration and/or management information for devices, the storage medium storing code comprising:
    code to provide a database storing device data structured in accordance with a common model of parameters related to the configuration and/or management of the devices;
    code to enter device data into the database in accordance with the common model when a software developer develops software for configuring and/or managing devices; and
    code to build a device configuration and/or management software product for use in the configuration and/or management of at least one device by including in the software product the data for a set of devices from the database store structured in accordance with the common model in the database for use by device management and control software to control a processing apparatus to configure and/or manage the devices using the data for at least one device included in the product and to provide the data for a device to the device to allow local configuration and/or management at the device, wherein device management and control software is built into the device configuration and/or management software product.

39. A device information development computer system for developing and managing configuration and/or management information for devices, the computer system comprising:
    a data store to store device data structured in accordance with a common model of parameters related to the configuration and/or management of the devices;
    a processor;
    interface code to operate on the processor to generate a developer interface to allow a software developer to develop software for configuring and/or managing devices and to enter device data into the data storage means in accordance with the common model;
    software product building code to operate on the processor to build a device configuration and/or management software product for configuring and/or managing at least one device, the software product building code being coded to build the software product by reading data for at least one device from the data storage means structured in accordance with the common model for use by device management and control software to control a processing apparatus to configure and/or manage the devices using the data for the devices included in the product and to provide the data for a device to the device to allow local configuration and/or management at the device; and
    a software store to store device management and control software for configuring and/or managing a device, wherein said software product building code is coded to build the software product to include the device management and control software.

40. A device information development computer system according to claim 39, wherein the devices comprise network devices and the common model is a model of parameters related to the configuration and/or management of the network devices.

41. A device information development computer system according to claim 39, wherein the parameters related to the configuration and/or management of the devices are suitable for central remote management of the devices and local management of each device.

42. A device information development computer system according to claim 39, wherein the common model of parameters related to the configuration and/or management of the devices comprises a model of hardware characteristics, software characteristics and relationships therebetween.

43. A device information development computer system according to claim 39, wherein said device data comprises configuration data and metadata, the metadata comprising management information for the configuration data and for the device.

44. A device information development computer system according to claim 39, wherein the device data includes interface data defining the configuration of a user interface to the device data.

45. A device information development computer system according to claim 44, wherein the interface data defines the configuration of each element of a user interface related to the display and/or input of a configuration parameter and/or management parameter.

46. A device information development computer system according to claim 44, wherein the interface data defines a management interface for configuring and/or managing the device and/or the device data.

47. A device information development computer system according to claim 44, including a user interface for providing an interface to a user using the interface data.

48. device information development computer system according to claim 47, wherein the user interface comprises a web server for providing the user interface as a web page.

49. A device information development computer system according to claim 39, wherein the developer interface is coded to allow a developer to enter device data for a new device by copying device data for another device and modifying the device data.

50. A device information development computer system according to claim 39, wherein the developer interface is coded to generate code stubs for management functionality from the device data for combination with software provided by the software developer to control the device to develop the software for configuring and/or managing the devices.

51. A device information development computer system according to claim 39, wherein the database store comprises a relational database store.

52. A device information development computer system according to claim 39, wherein the common model is an object model comprised of hardware objects, software object, and interface objects linking the hardware and software objects.

53. A device information development computer system according to claim 39, including a documentation store for storing documentation segments associated with respective parameters of the common model, and a documentation input device to allow the input of documentation segments for association with respective parameters of the common model.

54. A device information development computer system according to claim 53, including documentation generation code for generating documentation for a device by combining the stored document segments for parameters related to the configuration and/or management provided for the device.

55. A device information development computer system according to claim 39, wherein the common model includes a parameter to identify a configured device having configuration data for all configuration parameters, and a configuration profile for which some configuration data can be input to complete or modify the configuration data for a device.

56. A device information development computer system according to claim 55, wherein the common model includes a parameter to identify a configured device having some configuration data entered by a user and some configuration data provided from the partial configuration.

* * * * *